United States Patent
Kim et al.

(10) Patent No.: US 11,109,416 B2
(45) Date of Patent: Aug. 31, 2021

(54) METHOD AND USER EQUIPMENT FOR TRANSMITTING RANDOM ACCESS CHANNEL, AND METHOD AND BASE STATION FOR RECEIVING RANDOM ACCESS CHANNEL

(71) Applicant: LG ELECTRONICS INC., Seoul (KR)

(72) Inventors: Eunsun Kim, Seoul (KR); Kijun Kim, Seoul (KR); Sukhyon Yoon, Seoul (KR); Hyunsoo Ko, Seoul (KR); Byounghoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 57 days.

(21) Appl. No.: 16/497,784

(22) PCT Filed: Mar. 27, 2018

(86) PCT No.: PCT/KR2018/003592
§ 371 (c)(1),
(2) Date: Sep. 25, 2019

(87) PCT Pub. No.: WO2018/182283
PCT Pub. Date: Oct. 4, 2018

(65) Prior Publication Data
US 2021/0105820 A1    Apr. 8, 2021

Related U.S. Application Data

(60) Provisional application No. 62/633,570, filed on Feb. 21, 2018, provisional application No. 62/548,407, (Continued)

(51) Int. Cl.
*H04W 74/08* (2009.01)
*H04B 7/06* (2006.01)
(Continued)

(52) U.S. Cl.
CPC ...... *H04W 74/0833* (2013.01); *H04B 7/0626* (2013.01); *H04W 16/28* (2013.01);
(Continued)

(58) Field of Classification Search
CPC ........... H04W 74/0833; H04W 74/008; H04W 74/0891; H04W 16/28; H04W 74/02; H04B 7/0626
See application file for complete search history.

(56) References Cited

U.S. PATENT DOCUMENTS

| | | | |
|---|---|---|---|
| 2012/0314664 A1* | 12/2012 | Johansson | H04W 74/0833 370/329 |
| 2018/0279380 A1* | 9/2018 | Jung | H04W 56/0005 |
| 2018/0343595 A1* | 11/2018 | da Silva | H04B 7/0695 |

FOREIGN PATENT DOCUMENTS

| | | |
|---|---|---|
| KR | 1020140107185 | 9/2014 |
| KR | 1020160102448 | 8/2016 |
| WO | 2016122120 | 8/2016 |

OTHER PUBLICATIONS

PCT International Application No. PCT/KR2018/003592, Written Opinion of the International Searching Authority dated Jul. 17, 2018, 20 pages.

(Continued)

*Primary Examiner* — Thai Nguyen
(74) *Attorney, Agent, or Firm* — Lee, Hong, Degerman, Kang & Waimey

(57) ABSTRACT

A user equipment receives RACH resource information comprising connection relationship information between RACH resources and synchronization blocks of a cell, and RACH preamble information representing a preamble sequence dedicated to the user equipment. On the basis of the RACH resource information and the RACH preamble information, the user equipment transmits the preamble sequence on a first RACH resource connected with a first SS (Continued)

block of the cell, and transmits the preamble sequence on a second RACH resource connected with a second SS block of the cell.

10 Claims, 11 Drawing Sheets

Related U.S. Application Data filed on Aug. 22, 2017, provisional application No. 62/476,867, filed on Mar. 27, 2017.

(51) Int. Cl.
*H04W 16/28* (2009.01)
*H04W 74/00* (2009.01)
*H04W 74/02* (2009.01)

(52) U.S. Cl.
CPC ......... *H04W 74/008* (2013.01); *H04W 74/02* (2013.01); *H04W 74/0891* (2013.01)

(56) References Cited

OTHER PUBLICATIONS

Huawei, et al., "RACH Procedures and Resource Configuration", 3GPP TSG RAN WG1 Meeting #88, R1-1701724, Feb. 2017, 7 pages.
Intel, "PRACH Preamble and Resource Allocation", 3GPP TSG RAN WG1 Meeting #88, R1-1702184, Feb. 2017, 5 pages.

* cited by examiner (a) HO procedure with contention-based RACH (b) HO procedure with contention-free RACH

METHOD AND USER EQUIPMENT FOR TRANSMITTING RANDOM ACCESS CHANNEL, AND METHOD AND BASE STATION FOR RECEIVING RANDOM ACCESS CHANNEL

CROSS-REFERENCE TO RELATED APPLICATIONS

This application is the National Stage filing under 35 U.S.C. 371 of International Application No. PCT/KR2018/003592, filed on Mar. 27, 2018, which claims the benefit of U.S. Provisional Application No. 62/476,867, filed on Mar. 27, 2017, 62/548,407, filed on Aug. 22, 2017, and 62/633,570, filed on Feb. 21, 2018, the contents of which are all hereby incorporated by reference herein in their entirety.

TECHNICAL FIELD

The present disclosure relates to a wireless communication system. Particularly, the present disclosure relates to a method and apparatus for transmitting/receiving a random access channel.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

As more communication devices have demanded higher communication capacity, there has been necessity of enhanced mobile broadband (eMBB) relative to legacy radio access technology (RAT). In addition, massive machine type communication (mMTC) for providing various services anytime and anywhere by connecting a plurality of devices and objects to each other is one main issue to be considered in future-generation communication.

Further, a communication system to be designed in consideration of services/UEs sensitive to reliability and latency is under discussion. The introduction of future-generation RAT has been discussed by taking into consideration eMBB communication, mMTC, ultra-reliable and low-latency communication (URLLC), and the like.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

In addition, with development of smart devices, a new method in which small volumes of data may be efficiently transmitted/received or less frequently generated data may be efficiently transmitted/received is needed.

In addition, a signal transmission/reception method is required in the system supporting new radio access technologies using high frequency bands.

The technical objects that can be achieved through the present disclosure are not limited to what has been particularly described hereinabove and other technical objects not described herein will be more clearly understood by persons skilled in the art from the following detailed description.

Technical Solution

According to an aspect of the present disclosure, provided herein is a method of transmitting a random access channel (RACH) by a user equipment (UE) in a wireless communication system. The method includes: receiving RACH resource information, including information about an association relation between synchronization signal (SS) blocks of a cell and RACH resources, and RACH preamble information indicating a preamble sequence dedicated to the UE; and transmitting the preamble sequence on a first RACH resource associated with a first SS block of the cell and transmitting the preamble sequence on a second RACH resource associated with a second SS block of the cell, based on the RACH resource information and the RACH preamble information.

In another aspect of the present disclosure, provided herein is a method of receiving a random access channel (RACH) by a base station (BS) in a wireless communication system. The method includes: transmitting RACH resource information, including information about an association relation between synchronization signal (SS) blocks of a cell and RACH resources, and RACH preamble information indicating a preamble sequence dedicated to the UE; and receiving the preamble sequence on a first RACH resource associated with a first SS block of the cell and receiving the preamble sequence on a second RACH resource associated with a second SS block of the cell, based on the RACH resource information and the RACH preamble information.

In another aspect of the present disclosure, provided herein is a user equipment (UE) for transmitting a random access channel (RACH) in a wireless communication system. The UE includes a radio frequency (RF) unit, and a processor configured to control the RF unit. The processor is configured to: control the RF unit to receive RACH resource information, including information about an association relation between synchronization signal (SS) blocks of a cell and RACH resources, and RACH preamble information indicating a preamble sequence dedicated to the UE; and control the RF unit to transmit the preamble sequence on a first RACH resource associated with a first SS block of the cell and transmit the preamble sequence on a second RACH resource associated with a second SS block of the cell, based on the RACH resource information and the RACH preamble information.

In another aspect of the present disclosure, provided herein a base station (BS) for receiving a random access channel (RACH) in a wireless communication system. The BS includes a radio frequency (RF) unit, and a processor configured to control the RF unit. The processor is configured to: control the RF unit to transmit RACH resource information, including information about an association relation between synchronization signal (SS) blocks of a cell and RACH resources, and RACH preamble information indicating a preamble sequence dedicated to the UE; and control the RF unit to receive the preamble sequence on a first RACH resource associated with a first SS block of the cell and receive the preamble sequence on a second RACH resource associated with a second SS block of the cell, based on the RACH resource information and the RACH preamble information.

In each aspect of the present disclosure, the preamble sequence the preamble sequence may be transmitted with the same transmission power on the first RACH resource and the second RACH resource.

In each aspect of the present disclosure, the RACH resources may be configured for a contention-free RACH.

In each aspect of the present disclosure, the UE may monitor a random access response (RAR) for the preamble sequences transmitted on the first RACH resource and the second RACH resource during an RAR time window.

In each aspect of the present disclosure, the BS may transmit a random access response (RAR) for the preamble sequences transmitted on the first RACH resource and the second RACH resource during an RAR time window.

In each aspect of the present disclosure, the RAR may include beam direction information for the UE. The beam direction information may be an SS block index or channel state information reference signal index.

The above technical solutions are merely some parts of the embodiments of the present disclosure and various embodiments into which the technical features of the present disclosure are incorporated can be derived and understood by persons skilled in the art from the following detailed description of the present disclosure.

Advantageous Effects

According to the present disclosure, uplink/downlink signals can be efficiently transmitted/received. Therefore, overall throughput of a radio communication system can be improved.

According to an embodiment of the present disclosure, delay/latency occurring during communication between a user equipment and a base station may be reduced.

In addition, it is possible to efficiently transmit/receive not only a small amount of data but also data which occurs infrequently owing to development of smart devices.

Moreover, signals can be transmitted/received in the system supporting new radio access technologies.

It will be appreciated by persons skilled in the art that that the effects that can be achieved through the present disclosure are not limited to what has been particularly described hereinabove and other advantages of the present disclosure will be more clearly understood from the following detailed description.

BRIEF DESCRIPTION OF THE DRAWINGS

The accompanying drawings, which are included to provide a further understanding of the disclosure, illustrate embodiments of the disclosure and together with the description serve to explain the principle of the disclosure.

MODE FOR CARRYING OUT THE INVENTION

Figure 1:
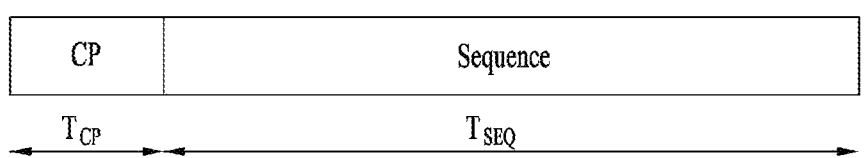
FIG. 1 illustrates a random access preamble format in a legacy LTE/LTE-A system.

Reference will now be made in detail to the exemplary embodiments of the present disclosure, examples of which are illustrated in the accompanying drawings. The detailed description, which will be given below with reference to the accompanying drawings, is intended to explain exemplary embodiments of the present disclosure, rather than to show the only embodiments that can be implemented according to the disclosure. The following detailed description includes specific details in order to provide a thorough understanding of the present disclosure. However, it will be apparent to those skilled in the art that the present disclosure may be practiced without such specific details.

In some instances, known structures and devices are omitted or are shown in block diagram form, focusing on important features of the structures and devices, so as not to obscure the concept of the present disclosure. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present disclosure is applied to 3GPP based communication system, e.g. LTE/LTE-A, NR. However, the technical features of the present disclosure are not limited thereto. For example, although the following detailed description is given based on a mobile communication system corresponding to a 3GPP LTE/LTE-A/NR system, aspects of the present disclosure that are not specific to 3GPP LTE/LTE-A/NR are applicable to other mobile communication systems.

For example, the present disclosure is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In embodiments of the present disclosure described below, the term "assume" may mean that a subject to transmit a channel transmits the channel in accordance with the corresponding "assumption". This may also mean that a subject to receive the channel receives or decodes the channel in a form conforming to the "assumption", on the assumption that the channel has been transmitted according to the "assumption".

In the present disclosure, puncturing a channel on a specific resource means that the signal of the channel is mapped to the specific resource in the procedure of resource mapping of the channel, but a portion of the signal mapped to the punctured resource is excluded in transmitting the channel. In other words, the specific resource which is punctured is counted as a resource for the channel in the procedure of resource mapping of the channel, a signal mapped to the specific resource among the signals of the channel is not actually transmitted. The receiver of the channel receives, demodulates or decodes the channel, assuming that the signal mapped to the specific resource is not transmitted. On the other hand, rate-matching of a channel on a specific resource means that the channel is never mapped to the specific resource in the procedure of resource mapping of the channel, and thus the specific resource is not used for transmission of the channel. In other words, the rate-matched resource is not counted as a resource for the channel in the procedure of resource mapping of the channel. The receiver of the channel receives, demodulates, or decodes the channel, assuming that the specific rate-matched resource is not used for mapping and transmission of the channel.

In the present disclosure, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present disclosure, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. Particularly, a BS of a UTRAN is referred to as a Node-B, a BS of an E-UTRAN is referred to as an eNB, and a BS of a new radio access technology network is referred to as a gNB. In describing the present disclosure, a BS will be referred to as a gNB.

In the present disclosure, a node refers to a fixed point capable of transmitting/receiving a radio signal through communication with a UE. Various types of gNBs may be used as nodes irrespective of the terms thereof. For example, a BS, a node B (NB), an e-node B (eNB), a pico-cell eNB (PeNB), a home eNB (HeNB), gNB, a relay, a repeater, etc. may be a node. In addition, the node may not be a gNB. For example, the node may be a radio remote head (RRH) or a radio remote unit (RRU). The RRH or RRU generally has a lower power level than a power level of a gNB. Since the RRH or RRU (hereinafter, RRH/RRU) is generally connected to the gNB through a dedicated line such as an optical cable, cooperative communication between RRH/RRU and the gNB can be smoothly performed in comparison with cooperative communication between gNBs connected by a radio line. At least one antenna is installed per node. The antenna may mean a physical antenna or mean an antenna port or a virtual antenna.

In the present disclosure, a cell refers to a prescribed geographical area to which one or more nodes provide a communication service. Accordingly, in the present disclosure, communicating with a specific cell may mean communicating with a gNB or a node which provides a communication service to the specific cell. In addition, a DL/UL signal of a specific cell refers to a DL/UL signal from/to a gNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between a gNB or node which provides a communication service to the specific cell and a UE. In the 3GPP based communication system, the UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node.

Meanwhile, a 3GPP based communication system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP communication standards use the concept of a cell to manage radio resources. The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). The carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

GPP based communication standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present disclosure, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present disclosure, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present disclosure, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of a gNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present disclosure, both a DMRS and a UE-RS refer to RSs for demodulation and, therefore, the terms DMRS and UE-RS are used to refer to RSs for demodulation.

For terms and technologies which are not described in detail in the present disclosure, reference can be made to the standard document of 3GPP LTE/LTE-A, for example, 3GPP TS 36.211, 3GPP TS 36.212, 3GPP TS 36.213, 3GPP TS 36.321, and 3GPP TS 36.331 and the standard document of 3GPP NR, for example, 3GPP TS 38.211, 3GPP TS 38.212, 3GPP 38.213, 3GPP 38.214, 3GPP 38.215, 3GPP TS 38.321, and 3GPP TS 36.331.

In an LTE/LTE-A system, when a UE is powered on or desires to access a new cell, the UE perform an initial cell search procedure including acquiring time and frequency synchronization with the cell and detecting a physical layer cell identity $N^{cell}_{ID}$ of the cell. To this end, the UE may receive synchronization signals, for example, a primary synchronization signal (PSS) and a secondary synchronization signal (SSS), from an eNB to thus establish synchronization with the eNB and acquire information such as a cell identity (ID). After the initial cell search procedure, the UE may perform a random access procedure to complete access to the eNB. To this end, the UE may transmit a preamble through a physical random access channel (PRACH) and receive a response message to the preamble through a PDCCH and a PDSCH. After performing the aforementioned procedures, the UE may perform PDCCH/PDSCH reception and PUSCH/PUCCH transmission as a normal UL/DL transmission procedure. The random access procedure is also referred to as a random access channel (RACH) procedure. The random access procedure is used for various purposes including initial access, adjustment of UL synchronization, resource assignment, and handover.

The random access procedure is classified into a contention-based procedure and a dedicated (that is, non-contention-based) procedure. The contention-based random access procedure is generally used for initial access, and the dedicated random access procedure is restrictively used for handover. In the contention-based random access procedure, the UE randomly selects RACH preamble sequence. Therefore, a plurality of UEs can transmit the same RACH preamble sequence, whereby a contention resolution procedure is required. On the other hand, in the dedicated random access procedure, the UE uses RACH preamble sequence uniquely allocated to a corresponding UE. Therefore, the UE may perform the random access procedure without contention with another UE.

The contention-based random access procedure includes four steps as follows. Hereinafter, messages transmitted in the steps 1 to 4 may be referred to as 1 to 4 (Msg1 to Msg4).

Step 1: RACH preamble (via PRACH)(UE to eNB)
Step 2: random access response (RAR)(via PDCCH 및 PDSCH)(eNB to UE)
Step 3: layer 2/layer 3 message (via PUSCH)(UE to eNB)
Step 4: contention resolution message (eNB to UE)

The dedicated random access procedure, i.e., contention-free random access procedure includes three steps as follows. Hereinafter, messages transmitted in steps 0 to 2 may be referred to as messages 0 to 2 (Msg0 to Msg2). As a part of the random access procedure, uplink transmission (that is, step 3) corresponding to RAR may be performed. The dedicated random access procedure may be triggered using a PDCCH (hereinafter, PDCCH order) for commanding RACH preamble transmission.

Step 0: RACH preamble allocation (eNB to UE) through dedicated signaling

Step 1: RACH preamble (via PRACH)(UE to eNB)

Step 2: random access response (RAR)(via PDCCH 및 PDSCH)(eNB to UE

After transmitting the RACH preamble, the UE attempts to receive a random access response (RAR) within a preset time window. Specifically, in the LTE/LTE-A system, the UE attempts to detect a PDCCH with a random access radio network temporary identifier (RA-RNTI) (hereinafter, RA-RNTI PDCCH) (e.g., CRC is masked with RA-RNTI on the PDCCH) in the time window. In detecting the RA-RNTI PDCCH, the UE checks the PDSCH corresponding to the RA-RNTI PDCCH for presence of an RAR directed thereto. The RAR includes timing advance (TA) information indicating timing offset information for UL synchronization, UL resource allocation information (UL grant information), and a temporary UE identifier (e.g., temporary cell-RNTI (TC-RNTI)). The UE may perform UL transmission (of, e.g., Msg3) according to the resource allocation information and the TA value in the RAR. HARQ is applied to UL transmission corresponding to the RAR. Accordingly, after transmitting Msg3, the UE may receive acknowledgement information (e.g., PHICH) corresponding to Msg3.

FIG. 1 illustrates a random access preamble format in a legacy LTE/LTE-A system.

In the legacy LTE/LTE-A system, a random access preamble, i.e., a RACH preamble, includes a cyclic prefix having a length $T_{CP}$ and a sequence part having a length $T_{SEQ}$ in a physical layer. The parameter values $T_{CP}$ and $T_{SEQ}$ are listed in the following table, and depend on the frame structure and the random access configuration. Higher layers control the preamble format. In the 3GPP LTE/LTE-A system, PRACH configuration information is signaled through system information and mobility control information of a cell. The PRACH configuration information indicates a root sequence index, a cyclic shift unit Ncs of a Zadoff-Chu sequence, the length of the root sequence, and a preamble format, which are to be used for a RACH procedure in the cell. In the 3GPP LTE/LTE-A system, a PRACH occasion, which is a timing at which the preamble format and the RACH preamble may be transmitted, is indicated by a PRACH configuration index, which is a part of the RACH configuration information (refer to Section 5.7 of 3GPP TS 36.211 and "PRACH-Config" of 3GPP TS 36.331). The length of the Zadoff-Chu sequence used for the RACH preamble is determined according to the preamble format.

TABLE 1

| Preamble format | $T_{CP}$ | $T_{SEQ}$ |
|---|---|---|
| 0 | $3168 \cdot T_s$ | $24576 \cdot T_s$ |
| 1 | $21024 \cdot T_s$ | $24576 \cdot T_s$ |
| 2 | $6240 \cdot T_s$ | $2 \cdot 24576 \cdot T_s$ |
| 3 | $21024 \cdot T_s$ | $2 \cdot 24576 \cdot T_s$ |
| 4 | $448 \cdot T_s$ | $4096 \cdot T_s$ |

In the LTE/LTE-A system, the RACH preamble is transmitted in a UL subframe. The transmission of a random access preamble is restricted to certain time and frequency resources. These resources are called PRACH resources, and enumerated in increasing order of the subframe number within the radio frame and the PRBs in the frequency domain such that index 0 correspond to the lowest numbered PRB and subframe within the radio frame. Random access resources are defined according to the PRACH configuration index (refer to the standard document of 3GPP TS 36.211). The PRACH configuration index is given by a higher layer signal (transmitted by an eNB).

The sequence part of the RACH preamble (hereinafter, preamble sequence) uses a Zadoff-Chu sequence. The preamble sequences for RACH are generated from Zadoff-Chu sequences with zero correlation zone, generated from one or several root Zadoff-Chu sequences. The network configures the set of preamble sequences the UE is allowed to use. In the legacy LTE/LTE-A system, there are 64 preambles available in each cell. The set of 64 preamble sequences in a cell is found by including first, in the order of increasing cyclic shift, all the available cyclic shifts of a root Zadoff-Chu sequence with the logical index RACH_ROOT_SEQUENCE, where RACH_ROOT_SEQUENCE is broadcasted as part of the system information. Additional preamble sequences, in case 64 preambles cannot be generated from a single root Zadoff-Chu sequence, are obtained from the root sequences with the consecutive logical indexes until all the 64 sequences are found. The logical root sequence order is cyclic: the logical index 0 is consecutive to 837. The relation between a logical root sequence index and physical root sequence index u is given for preamble formats 0~3 and 4, respectively.

In the LTE/LTE-A system, a subcarrier spacing $\Delta f$ is 15 kHz or 7.5 kHz, whereas a subcarrier spacing $\Delta f_{RA}$ for a random access preamble is 1.25 kHz or 0.75 kHz.

In case of a physical non-synchronized random access procedure in the LTE/LTE-A system, the L1 random access procedure encompasses a transmission of the random access preamble and a random access response in view of the physical layer. The remaining messages are scheduled for transmission by an upper layer on a common data channel. The random access channel occupies 6 resource blocks within one subframe or a set of consecutive subframes reserved for random access preamble transmission. The eNB is not prohibited to schedule data within the resource blocks reserved for random access response. In the LTE/LTE-A system, the eNB transmits information about UL transmission power for RACH preamble transmission in RACH configuration information. The following steps are required for layer 1 (L1) random access procedure.

Layer 1 procedure is triggered upon request of preamble transmission by the higher layer.

Preamble index, target preamble received power PREAMBLE_RECEIVED_TARGET_POWER, corresponding RA-RNTI and PRACH resource are indicated by the higher layer as a part of the request.

A preamble transmission power $P_{PRACH}$ is determined as $P_{PRACH}=\min\{P_{CMAX,c}(i), \text{PREAMBLE\_RECEIVED\_TARGET\_POWER}+PL_c\}\_[dBm]$. In this case, $P_{CMAX,c}(i)$ is a configured UE transmission power for subframe i of a service cell c, defined in 3GPP TS 36.101, and $PL_c$ is a downlink path loss estimate value calculated for the serving cell c within the UE.

A preamble sequence is selected from a preamble sequence set by using the preamble index.

A single preamble is transmitted using a selected preamble sequence at a transmission power $P_{PRACH}$ on an indicated PRACH resource.

Detection of PDCCH is attempted with the indicated RA-RNTI during a window controlled by the higher layer (see section 5.1.4 of 3GPP TS 36.321). If detected, a corresponding DL-SCH transport block is passed to the higher layer. The higher layer parses the transport block and indicates 20-bit uplink grant to the physical layer.

In case of the LTE/LTE-A system, a random access procedure in a medium access control (MAC) layer is performed as follows:
set PREAMBLE_RECEIVED_TARGET_POWER 'preambleInitialReceivedTargetPower+DELTA_PREAMBLE+(PREAMBLE_TRANSMISSION_COUNTER−1)*powerRampingStep';
if the UE is a bandwidth limited (BL) UE or a UE within enforced coverage:
the UE instructs the physical layer to transmit a preamble with the number of repetitions (that is, numRepetitionPerPreambleAttempt) required for preamble transmission corresponding to a selected preamble group by using a selected PRACH resource corresponding to a selected enhanced coverage level, corresponding RA-RANTI, preamble index, and PREAMBLE_RECEIVED_TARGET_POWER.
else: and
the UE instructs the physical layer to transmit the preamble by using a selected PRACH, corresponding RA-RNTI, preamble index and PREAMBLE_RECEIVED_TARGET_POWER.

In the LTE/LTE-A system, information on UL transmission power for RACH preamble transmission is also included in RACH configuration and then delivered to the UE. For example, preambleInitialReceivedTargetPower, powerRampingStep, preambleTransMax, etc. are delivered to the UE by RRC signal as UE common random access parameters (see PRACH-Config of 3GPP TS 36.331).

If the UE does not receive Msg2 within a certain time after transmitting RACH Msg1 (that is, RACH preamble), that is, does not receive RAR (that is, Msg2) within RAR window after transmitting RACH Msg1 (that is, RACH preamble), the UE may retransmit RACH Msg1. If the UE retransmits RACH Msg1, the UE may increase a transmission power of the RACH Msg1 to be higher than a power during previous transmission. In the LTE/LTE-A system, the transmission power of the RACH Msg1 is increased as much as a power ramping step by incrementing a layer-2 preamble transmission counter of the UE by 1. PREAMBLE_TRANSMISSION_COUNTER starts from 1 and is incremented by 1 whenever preamble transmission is attempted. If no RAR is received within RAR window, or if all the received RARs do not include random access preamble identifier corresponding to a random access preamble which was transmitted, it is considered that RAR reception is not successful, and the UE increments PREAMBLE_TRANSMISSION_COUNTER as much as 1. Preamble transmission may be performed within the maximum nmber of preamble transmissions preambleTransMax. For example, if PREAMBLE_TRANSMISSION_COUNTER=preambleTransMax+1, the MAC layer indicates a random access problem to the higher layer, and or considers that the random access procedure is completed unsuccessfully. DELTA_PREAMBLE is a value previously defined in accordance with a preamble format as follows (see Table 7.6-1 of 3GPP TS 36.321)

TABLE 2

| Preamble Format | DELTA_PREAMBLE value |
| --- | --- |
| 0 | 0 dB |
| 1 | 0 dB |
| 2 | −3 dB |
| 3 | −3 dB |
| 4 | 8 dB |

In Table 2, a preamble format is given by prach-ConfigIndex (refer to PRACH-Config of 3GPP TS 36.331 and section 5.7 of 3GPP TS 36.211).

As more communication devices have demanded higher communication capacity, there has been necessity of enhanced mobile broadband relative to legacy radio access technology (RAT). In addition, massive machine type communication for providing various services irrespective of time and place by connecting a plurality of devices and objects to each other is one main issue to be considered in future-generation communication. Further, a communication system design in which services/UEs sensitive to reliability and latency are considered is under discussion. The introduction of future-generation RAT has been discussed by taking into consideration enhanced mobile broadband communication, massive MTC, ultra-reliable and low-latency communication (URLLC), and the like. In current 3GPP, a study of the future-generation mobile communication system after EPC is being conducted. In the present disclosure, the corresponding technology is referred to as a new RAT (NR) or 5G RAT, for convenience.

An NR communication system demands that much better performance than a legacy fourth generation (4G) system be supported in terms of data rate, capacity, latency, energy consumption, and cost. Accordingly, the NR system needs to make progress in terms of bandwidth, spectrum, energy, signaling efficiency, and cost per bit.

<OFDM Numerology>

The new RAT system uses an OFDM transmission scheme or a similar transmission scheme. The new RAT system may follow the OFDM parameters different from OFDM parameters of the LTE system. Alternatively, the new RAT system may conform to numerology of the legacy LTE/LTE-A system but may have a broader system bandwidth (e.g., 100 MHz) than the legacy LTE/LTE-A system. One cell may support a plurality of numerologies. That is, UEs that operate with different numerologies may coexist within one cell.

<Slot Structure>

In the 3GPP LTE/LTE-A system, radio frame is 10 ms $(307,200T_s)$ in duration. The radio frame is divided into 10 subframes of equal size. Subframe numbers may be assigned to the 10 subframes within one radio frame, respectively. Here, $T_s$ denotes sampling time where $T_s=1/(2048*15\text{ kHz})$. Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like. The TTI refers to an interval during which data can be scheduled. For example, in a current LTE/LTE-A system, a transmission opportunity of a UL grant or a DL grant is present every 1 ms and several transmission opportunities of the UL/DL grant are not present within a shorter time than 1 ms. Therefore, the TTI in the legacy LTE/LTE-A system is 1 ms.

Figure 2:
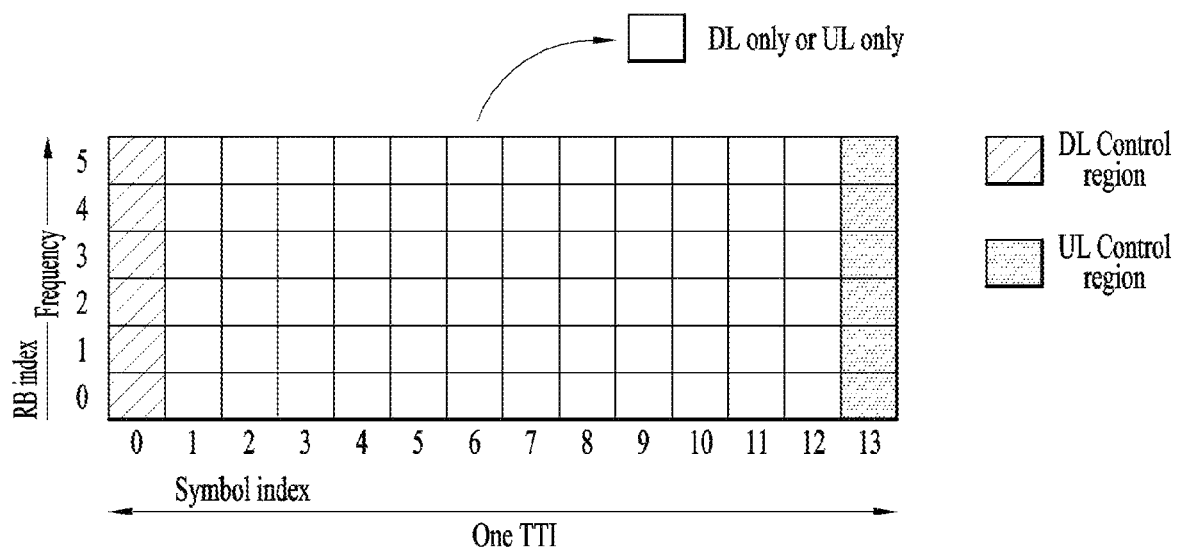
FIG. 2 illustrates a slot structure available in a new radio access technology (NR).

FIG. 2 illustrates a slot structure available in a new radio access technology (NR).

To minimize data transmission latency, in a 5G new RAT, a slot structure in which a control channel and a data channel are time-division-multiplexed is considered.

In FIG. 2, the hatched area represents the transmission region of a DL control channel (e.g., PDCCH) carrying the DCI, and the black area represents the transmission region of a UL control channel (e.g., PUCCH) carrying the UCI. Here, the DCI is control information that the gNB transmits to the UE. The DCI may include information on cell configuration that the UE should know, DL specific information such as DL scheduling, and UL specific information such as UL grant. The UCI is control information that the UE transmits to the gNB. The UCI may include a HARQ ACK/NACK report on the DL data, a CSI report on the DL channel status, and a scheduling request (SR).

In FIG. 2, the region of symbols from symbol index 1 to symbol index 12 may be used for transmission of a physical channel (e.g., a PDSCH) carrying downlink data, or may be used for transmission of a physical channel (e.g., PUSCH) carrying uplink data. According to the slot structure of FIG. 2, DL transmission and UL transmission may be sequentially performed in one slot, and thus transmission/reception of DL data and reception/transmission of UL ACK/NACK for the DL data may be performed in one slot. As a result, the time taken to retransmit data when a data transmission error occurs may be reduced, thereby minimizing the latency of final data transmission.

In such a slot structure, a time gap is needed for the process of switching from the transmission mode to the reception mode or from the reception mode to the transmission mode of the gNB and UE. On behalf of the process of switching between the transmission mode and the reception mode, some OFDM symbols at the time of switching from DL to UL in the slot structure are set as a guard period (GP).

In the legacy LTE/LTE-A system, a DL control channel is time-division-multiplexed with a data channel and a PDCCH, which is a control channel, is transmitted throughout an entire system band. However, in the new RAT, it is expected that a bandwidth of one system reaches approximately a minimum of 100 MHz and it is difficult to distribute the control channel throughout the entire band for transmission of the control channel. For data transmission/reception of a UE, if the entire band is monitored to receive the DL control channel, this may cause increase in battery consumption of the UE and deterioration in efficiency. Accordingly, in the present disclosure, the DL control channel may be locally transmitted or distributively transmitted in a partial frequency band in a system band, i.e., a channel band.

In the NR system, a basic transmission unit is a slot. A slot duration may consist of 14 symbols with a normal cyclic prefix (CP) or 12 symbols with an extended CP. The slot is scaled in time as a function of a used subcarrier spacing.

<Analog Beamforming>

A recently discussed fifth generation (5G) mobile communication system is considering using an ultrahigh frequency band, i.e., a millimeter frequency band equal to or higher than 6 GHz, to transmit data to a plurality of users in a wide frequency band while maintaining a high transmission rate. In 3GPP, this system is used as NR and, in the present disclosure, this system will be referred to as an NR system. Since the millimeter frequency band uses too high a frequency band, a frequency characteristic thereof exhibits very sharp signal attenuation depending on distance. Therefore, in order to correct a sharp propagation attenuation characteristic, the NR system using a band of at least above 6 GHz uses a narrow beam transmission scheme to solve a coverage decrease problem caused by sharp propagation attenuation by transmitting signals in a specific direction so as to focus energy rather than in all directions. However, if a signal transmission service is provided using only one narrow beam, since a range serviced by one BS becomes narrow, the BS provides a broadband service by gathering a plurality of narrow beams.

In the millimeter frequency band, i e, millimeter wave (mmW) band, the wavelength is shortened, and thus a plurality of antenna elements may be installed in the same area. For example, a total of 100 antenna elements may be installed in a 5-by-5 cm panel in a 30 GHz band with a wavelength of about 1 cm in a 2-dimensional array at intervals of 0.5λ (wavelength). Therefore, in mmW, increasing the coverage or the throughput by increasing the beamforming (BF) gain using multiple antenna elements is taken into consideration.

As a method of forming a narrow beam in the millimeter frequency band, a beamforming scheme is mainly considered in which the BS or the UE transmits the same signal using a proper phase difference through a large number of antennas so that energy increases only in a specific direction. Such a beamforming scheme includes digital beamforming for imparting a phase difference to a digital baseband signal, analog beamforming for imparting a phase difference to a modulated analog signal using time latency (i.e., cyclic shift), and hybrid beamforming using both digital beamforming and analog beamforming. If a transceiver unit (TXRU) is provided for each antenna element to enable adjustment of transmit power and phase, independent beamforming is possible for each frequency resource. However, installing TXRU in all of the about 100 antenna elements is less feasible in terms of cost. That is, the millimeter frequency band needs to use numerous antennas to correct the sharp propagation attenuation characteristic. Digital beamforming requires as many radio frequency (RF) components (e.g., a digital-to-analog converter (DAC), a mixer, a power amplifier, a linear amplifier, etc.) as the number of antennas. Therefore, if digital beamforming is desired to be implemented in the millimeter frequency band, cost of communication devices increases. Hence, when a large number of antennas is needed as in the millimeter frequency band, use of analog beamforming or hybrid beamforming is considered. In the analog beamforming method, multiple antenna elements are mapped to one TXRU and a beam direction is adjusted using an analog phase shifter. This analog beamforming method may only make one beam direction in the whole band, and thus may not perform frequency selective beamforming (BF), which is disadvantageous. The hybrid BF method is an intermediate type of digital BF and analog BF and uses B TXRUs less in number than Q antenna elements. In the case of hybrid BF, the number of directions in which beams may be transmitted at the same time is limited to B or less, which depends on the method of collection of B TXRUs and Q antenna elements.

As mentioned above, digital BF may simultaneously transmit or receive signals in multiple directions using multiple beams by processing a digital baseband signal to be transmitted or received, whereas analog BF cannot simultaneously transmit or receive signals in multiple directions exceeding a coverage range of one beam by performing BF in a state in which an analog signal to be transmitted or received is modulated. Typically, the BS simultaneously performs communication with a plurality of users using broadband transmission or multi-antenna characteristics. If the BS uses analog or hybrid BF and forms an analog beam in one beam direction, the eNB communicates with only users included in the same analog beam direction due to an analog BF characteristic. A RACH resource allocation method and a resource use method of the BS according to the present disclosure, which will be described later, are proposed considering restrictions caused by the analog BF or hybrid BF characteristic.

<Hybrid Analog Beamforming>

Figure 3:
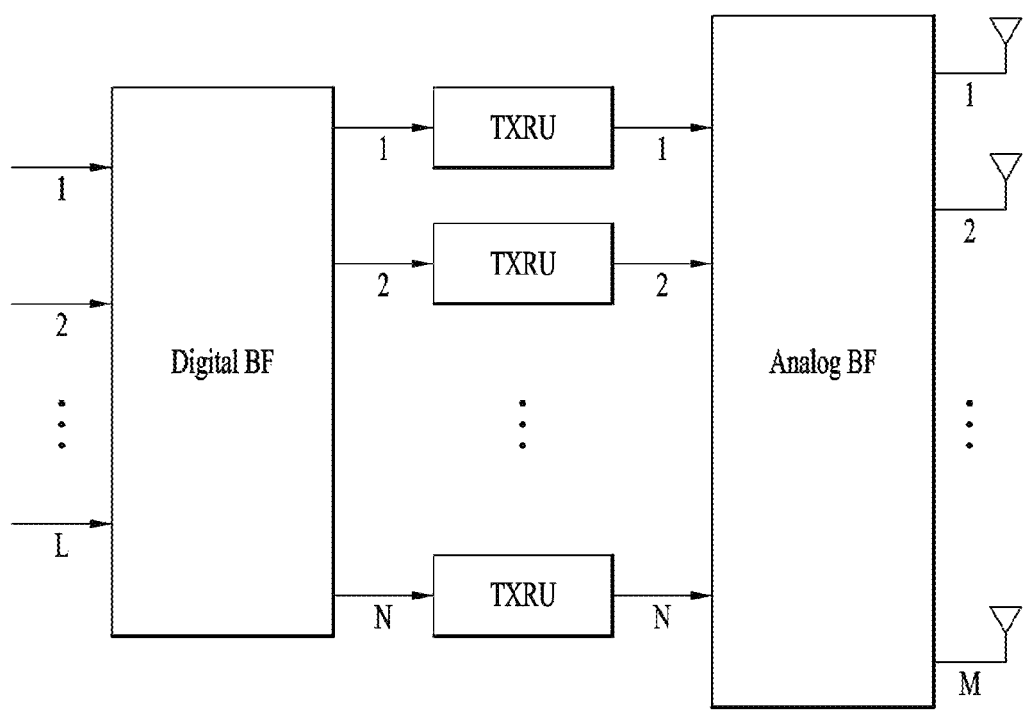
FIG. 3 abstractly illustrates transceiver units (TXRUs) and a hybrid beamforming structure in terms of physical antennas.

FIG. 3 abstractly illustrates TXRUs and a hybrid BF structure in terms of physical antennas.

When a plurality of antennas is used, a hybrid BF method in which digital BF and analog BF are combined is considered. Analog BF (or RF BF) refers to an operation in which an RF unit performs precoding (or combining). In hybrid BF, each of a baseband unit and the RF unit (also referred to as a transceiver) performs precoding (or combining) so that performance approximating to digital BF can be obtained while the number of RF chains and the number of digital-to-analog (D/A) (or analog-to-digital (A/D)) converters is reduced. For convenience, the hybrid BF structure may be expressed as N TXRUs and M physical antennas. Digital BF for L data layers to be transmitted by a transmitter may be expressed as an N-by-L matrix. Next, N converted digital signals are converted into analog signals through the TXRUs and analog BF expressed as an M-by-N matrix is applied to the analog signals. In FIG. 3, the number of digital beams is L and the number of analog beams is N. In the NR system, the BS is designed so as to change analog BF in units of symbols and efficient BF support for a UE located in a specific region is considered. If the N TXRUs and the M RF antennas are defined as one antenna panel, the NR system considers even a method of introducing plural antenna panels to which independent hybrid BF is applicable. In this way, when the BS uses a plurality of analog beams, since which analog beam is favorable for signal reception may differ according to each UE, a beam sweeping operation is considered so that, for at least a synchronization signal, system information, and paging, all UEs may have reception opportunities by changing a plurality of analog beams, that the BS is to apply, according to symbols in a specific slot or subframe.

Recently, a 3GPP standardization organization is considering network slicing to achieve a plurality of logical networks in a single physical network in a new RAT system, i.e., the NR system, which is a 5G wireless communication system. The logical networks should be capable of supporting various services (e.g., eMBB, mMTC, URLLC, etc.) having various requirements. A physical layer system of the NR system considers a method supporting an orthogonal frequency division multiplexing (OFDM) scheme using variable numerologies according to various services. In other words, the NR system may consider the OFDM scheme (or multiple access scheme) using independent numerologies in respective time and frequency resource regions.

Recently, as data traffic remarkably increases with appearance of smartphone devices, the NR system needs to support of higher communication capacity (e.g., data throughput). One method considered to raise the communication capacity is to transmit data using a plurality of transmission (or reception) antennas. If digital BF is desired to be applied to the multiple antennas, each antenna requires an RF chain (e.g., a chain consisting of RF elements such as a power amplifier and a down converter) and a D/A or A/D converter. This structure increases hardware complexity and consumes high power which may not be practical. Accordingly, when multiple antennas are used, the NR system considers the above-mentioned hybrid BF method in which digital BF and analog BF are combined.

Figure 4:
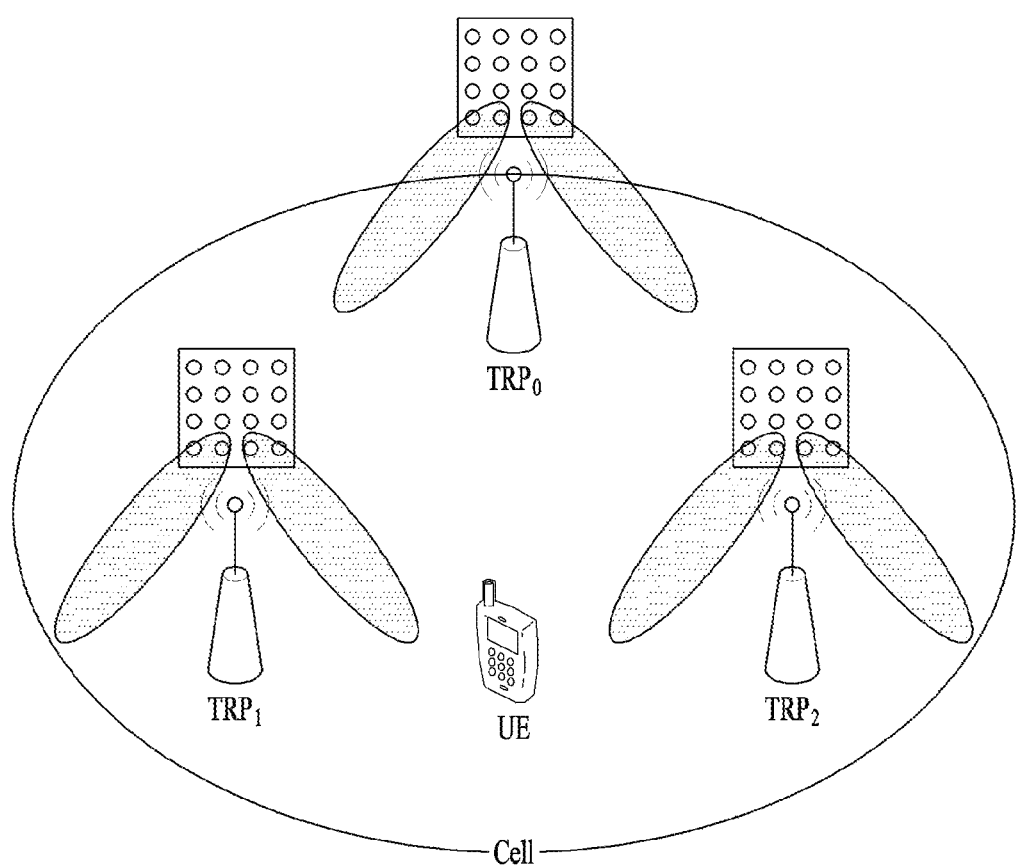
FIG. 4 illustrates a cell of a new radio access technology (NR) system.

FIG. 4 illustrates a cell of a new radio access technology (NR) system.

Referring to FIG. 4, in the NR system, a method in which a plurality of transmission and reception points (TRPs) form one cell is being discussed unlike a wireless communication system of legacy LTE in which one BS forms one cell. If the plural TRPs form one cell, seamless communication can be provided even when a TRP that provides a service to a UE is changed so that mobility management of the UE is facilitated.

In an LTE/LTE-A system, a PSS/SSS is transmitted omni-directionally. Meanwhile, a method is considered in which a gNB which uses millimeter wave (mmWave) transmits a signal such as a PSS/SSS/PBCH through BF while sweeping beam directions omni-directionally. Transmission/reception of a signal while sweeping beam directions is referred to as beam sweeping or beam scanning. In the present disclosure, "beam sweeping" represents a behavior of a transmitter and "beam scanning" represents a behavior of a receiver. For example, assuming that the gNB may have a maximum of N beam directions, the gNB transmits a signal such as a PSS/SSS/PBCH in each of the N beam directions. That is, the gNB transmits a synchronization signal such as the PSS/SSS/PBCH in each direction while sweeping directions that the gNB can have or the gNB desires to support. Alternatively, when the gNB can form N beams, one beam group may be configured by grouping a few beams and the PSS/SSS/PBCH may be transmitted/received with respect to each beam group. In this case, one beam group includes one or more beams. The signal such as the PSS/SSS/PBCH transmitted in the same direction may be defined as one synchronization (SS) block and a plurality of SS blocks may be present in one cell. When the plural SS blocks are present, SS block indexes may be used to distinguish between the SS blocks. For example, if the PSS/SSS/PBCH is transmitted in 10 beam directions in one system, the PSS/SSS/PBCH transmitted in the same direction may constitute one SS block and it may be understood that 10 SS blocks are present in the system. In the present disclosure, a beam index may be interpreted as an SS block index.

Figure 5:
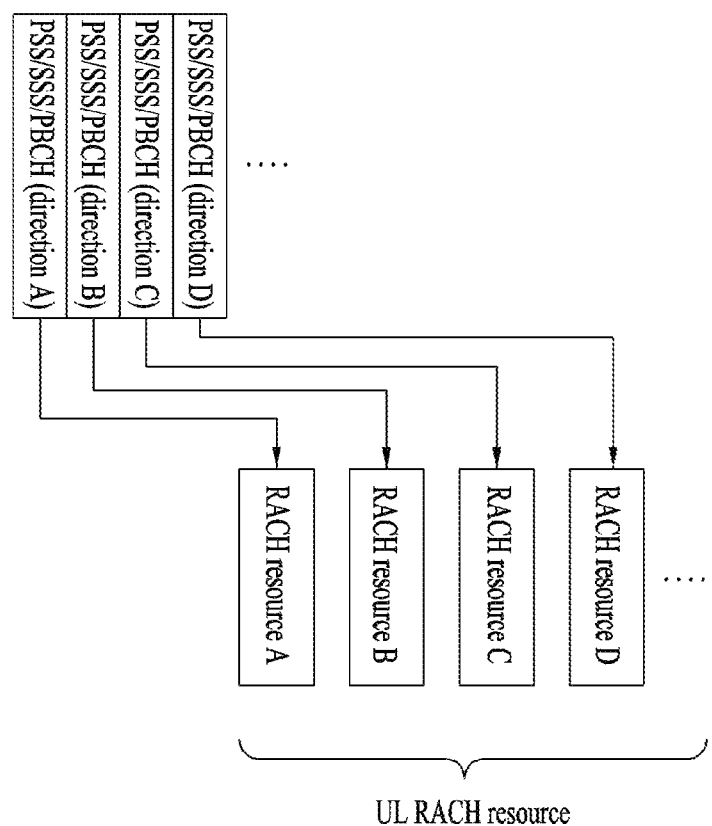
FIG. 5 illustrates transmission of a synchronization signal (SS) block and a RACH resource linked to the SS block.

FIG. 5 illustrates transmission of an SS block and a RACH resource linked to the SS block.

To communicate with one UE, the gNB should acquire an optimal beam direction between the gNB and the UE and should continuously track the optimal beam direction because the optimal beam direction is changed as the UE moves. A procedure of acquiring the optimal beam direction between the gNB and the UE is referred to as a beam acquisition procedure and a procedure of continuously tracking the optimal beam direction is referred to as a beam tracking procedure. The beam acquisition procedure is needed for 1) initial access in which the UE first attempts to access the gNB, 2) handover in which the UE is handed over from one gNB to another gNB, or 3) beam recovery for recovering from a state in which the UE and gNB cannot maintain an optimal communication state or enter a communication impossible state, i.e., beam failure, as a result of losing an optimal beam while performing beam tracking for searching for the optimal beam between the UE and the gNB.

In the case of the NR system which is under development, a multi-stage beam acquisition procedure is under discussion, for beam acquisition in an environment using multiple beams. In the multi-stage beam acquisition procedure, the gNB and the UE perform connection setup using a wide beam in an initial access stage and, after connection setup is ended, the gNB and the UE perform communication with optimal quality using a narrow band. In the present disclosure, although various methods for beam acquisition of the NR system are mainly discussed, the most actively discussed method at present is as follows.

1) The gNB transmits an SS block per wide beam in order for the UE to search for the gNB in an initial access procedure, i.e., performs cell search or cell acquisition, and to search for an optimal wide beam to be used in a first stage of beam acquisition by measuring channel quality of each wide beam. 2) The UE performs cell search for an SS block per beam and performs DL beam acquisition using a cell detection result of each beam. 3) The UE performs a RACH procedure in order to inform the gNB that the UE will access the gNB that the UE has discovered. 4) The gNB connects or associates the SS block transmitted per beam and a RACH resource to be used for RACH transmission, in order to cause the UE to inform the gNB of a result of the RACH procedure and simultaneously a result of DL beam acquisition (e.g., beam index) at a wide beam level. If the UE performs the RACH procedure using a RACH resource connected to an optimal beam direction that the UE has discovered, the gNB obtains information about a DL beam suitable for the UE in a procedure of receiving a RACH preamble.

<Beam Correspondence (BC)>

In a multi-beam environment, whether a UE and/or a TRP can accurately determine a transmission (Tx) or reception (Rx) beam direction between the UE and the TRP is problematic. In the multi-beam environment, signal transmission repetition or beam sweeping for signal reception may be considered according to a Tx/Rx reciprocal capability of the TRP (e.g., eNB) or the UE. The Tx/Rx reciprocal capability is also referred to as Tx/Rx beam correspondence (BC) in the TRP and the UE. In the multi-beam environment, if the Tx/Rx reciprocal capability in the TRP or the UE does not hold, the UE may not transmit a UL signal in a beam direction in which the UE has received a DL signal because an optimal path of UL may be different from an optimal path of DL. Tx/Rx BC in the TRP holds, if the TRP can determine a TRP Rx beam for UL reception based on DL measurement of UE for one or more Tx beams of the TRP and/or if the TRP can determine a TRP Tx beam for DL transmission based on UL measurement for one or more Rx beams of the TRP. Tx/Rx BC in the UE holds if the UE can determine a UE Rx beam for UL transmission based on DL measurement of UE for one or more Rx beams of the UE and/or if the UE can determine a UE Tx beam for DL reception according to indication of the TRP based on UL measurement for one or more Tx beams of the UE.

In the LTE system and the NR system, a RACH signal used for initial access to the gNB, i.e., initial access to the gNB through a cell used by the gNB, may be configured using the following elements.

Cyclic prefix (CP): This element serves to prevent interference generated from a previous/front (OFDM) symbol and group RACH preamble signals arriving at the gNB with various time delays into one time zone. That is, if the CP is configured to match a maximum radius of a cell, RACH preambles that UEs in the cell have transmitted in the same resource are included in a RACH reception window corresponding to the length of RACH preambles configured by the gNB for RACH reception. A CP length is generally set to be equal to or greater than a maximum round trip delay.

Preamble: A sequence used by the gNB to detect signal transmission is defined and the preamble serves to carry this sequence.

Guard time (GT): This element is defined to cause a RACH signal arriving at the gNB with delay from the farthest distance from the gNB on RACH coverage not to create interference with respect to a signal arriving after a RACH symbol duration. During this GT, the UE does not transmit a signal so that the GT may not be defined as the RACH signal.

Figure 6:
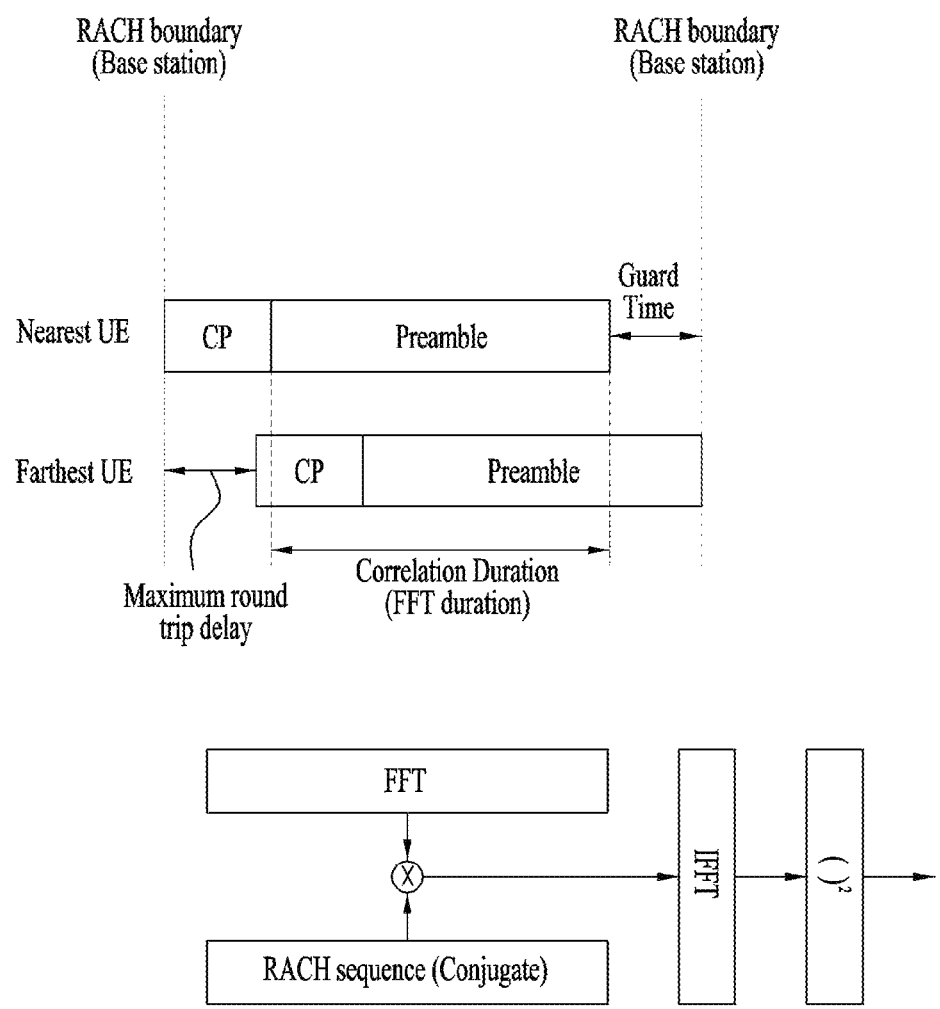
FIG. 6 illustrates configuration/format of a random access channel (RACH) preamble and a receiver function.

FIG. 6 illustrates configuration/format of a RACH preamble and a receiver function.

The UE transmits a RACH signal through a designated RACH resource at a system timing of the gNB obtained through an SS. The gNB receives signals from multiple UEs. Generally, the gNB performs the procedure illustrated in FIG. 5 for RACH signal reception. Since a CP for the RACH signal is set to a maximum round trip delay or more, the gNB may configure an arbitrary point between the maximum round trip delay and the CP length as a boundary for signal reception. If the boundary is determined as a start point for signal reception and if correlation is applied to a signal of a length corresponding to a sequence length from the start point, the gNB may acquire information as to whether the RACH signal is present and information about the CP.

If a communication environment operated by the gNB such as a millimeter band uses multiple beams, the RACH signal arrives at the eNB from multiple directions and the gNB needs to detect the RACH preamble (i.e., PRACH) while sweeping beam directions to receive the RACH signal arriving from multiple directions. As mentioned above, when analog BF is used, the gNB performs RACH reception only in one direction at one timing. For this reason, it is necessary to design the RACH preamble and a RACH procedure so that the gNB may properly detect the RACH preamble. The present disclosure proposes the RACH preamble and/or the RACH procedure for a high frequency band to which the NR system, especially, BF, is applicable in consideration of the case in which BC of the gNB holds and the case in which BC does not hold.

Figure 7:
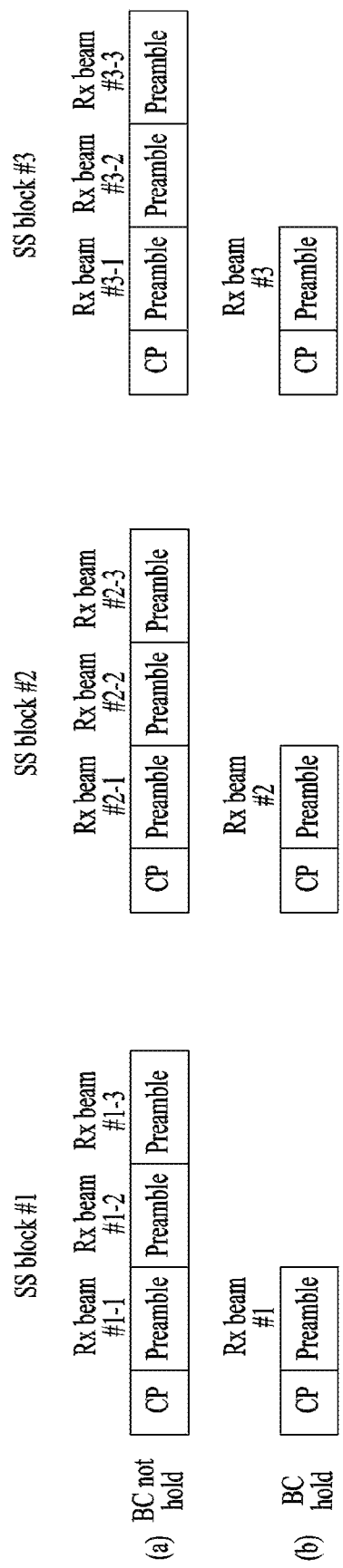
FIG. 7 illustrates a reception (Rx) beam formed at a gNB to receive a RACH preamble.

FIG. 7 illustrates a reception (Rx) beam formed at a gNB to receive a RACH preamble.

If BC does not hold, beam directions may be mismatched even when the gNB forms an Rx beam in a Tx beam direction of an SS block in a state in which a RACH resource is linked to the SS block. Therefore, a RACH preamble may be configured in a format illustrated in FIG. 7(a) so that the gNB may perform beam scanning for performing/attempting to perform RACH preamble detection in multiple directions while sweeping Rx beams. Meanwhile, if BC holds, since the RACH resource is linked to the SS block, the gNB may form an Rx beam in a direction used to transmit the SS block with respect to one RACH resource and detect the RACH preamble only in that direction. Therefore, the RACH preamble may be configured in a format illustrated in FIG. 7(b).

As described previously, a RACH signal and a RACH resource should be configured in consideration of two purposes of a DL beam acquisition report and a DL preferred beam report of the UE and beam scanning of the gNB according to BC.

Upon configuring the RACH resource for RACH preamble transmission, if BC holds, the gNB only needs to allocate one RACH resource at a proper timing as mentioned above. However, if BC does not hold, an RACH resource for beam sweeping (of the UE) or beam scanning (of the gNB) should be configured. To configure the RACH resource for the gNB when BC does not hold, a) beam sweeping after beam scanning or b) beam scanning after beam sweeping may be considered.

Figure 8:
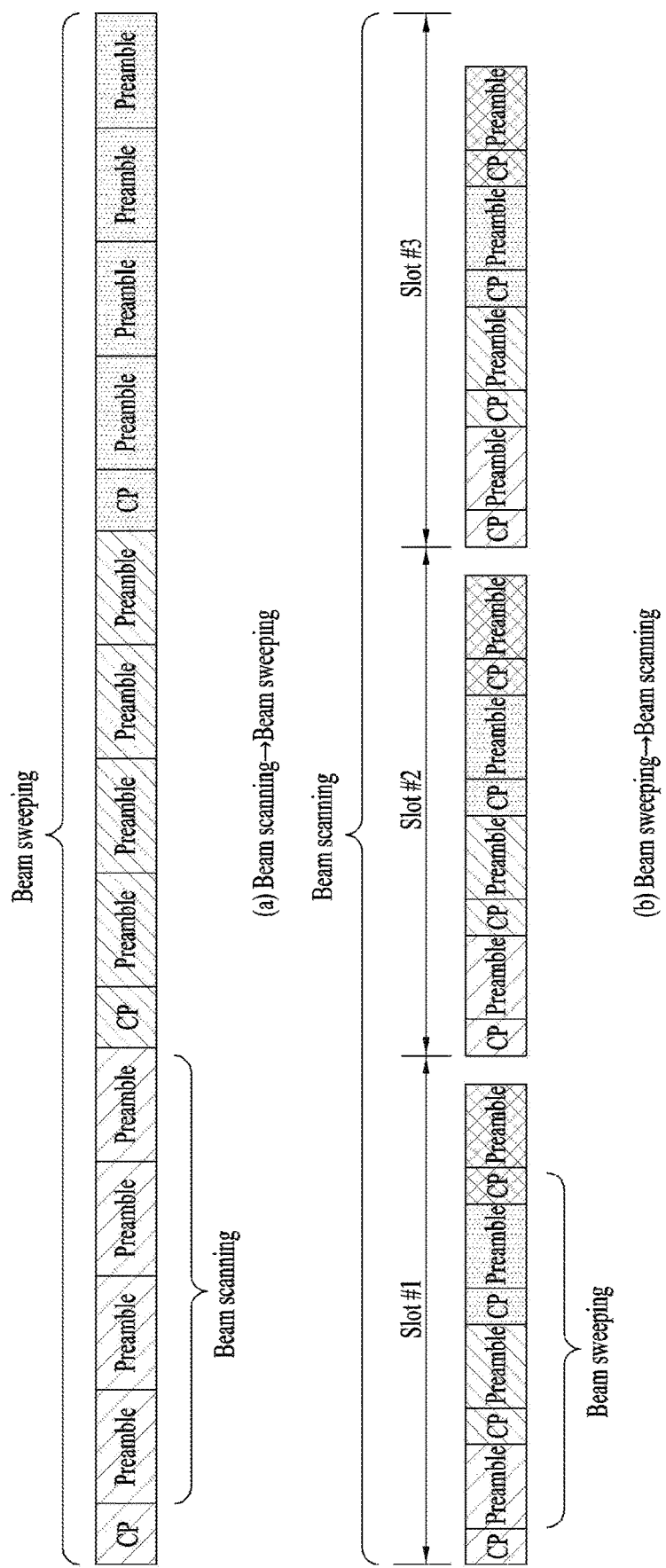
FIG. 8 illustrates an RACH resource configuration considering beam scanning and beam sweeping.

FIG. 8 illustrates an RACH resource configuration considering beam scanning and beam sweeping.

Referring to FIG. 8(a), when the gNB performs beam scanning first, the UE may transmit a plurality of preambles by concatenating the preambles without a CP. In this case, the gNB performs beam scanning of attempting to receive an RACH preamble while changing a received beam direction. When the gNB uses an analog beam, the gNB has difficulty in performing scheduling in units of slot in a slot in which an RACH resource allocated to the UE is configured. As one of methods of performing scheduling in a slot in which the RACH resource is configured, the gNB configures a minislot in the slot in which the RACH resource is configured and performs scheduling in units of minislot. Since beam scanning is performed because BC of the gNB does not hold, as another method of performing scheduling in the slot in which the RACH resource is configured, the gNB configures a UE-dedicated RACH resource, which coincides with a common RACH resource time in a matched Rx beam direction of the gNB, in a slot in which a common RACH resource is configured and informs the UE of the configured UE-dedicated RACH resource.

In the method of FIG. 8(a), since it is difficult to perform slot-unit scheduling in slot(s) in which the RACH resource is configured, the degree of freedom of scheduling of the gNB is lowered. Although the UE performs beam sweeping to solve such a problem, the problem is not completely overcome even if beam sweeping of the UE is preferentially performed over beam scanning of the gNB. For the degree of freedom of the gNB, the gNB may allocate an RACH resource for beam scanning and, to configure an Rx beam direction of the gNB in a slot unit, the gNB configures the RACH resource in a slot unit. Even though RACH resources are not concatenated, if the RACH resource is configured in a slot unit, an RACH preamble may be transmitted/received while maintaining the degree of scheduling freedom of the gNB. If an RACH signal format is formed in one slot or plural slots, the gNB configures the RACH resource within the plural slots and informs the UE of the configured RACH resource. Referring to FIG. 8(b), for example, the gNB may configure the RACH resource such that an RACH signal consisting of a CP and a preamble may be transmitted multiple times for beam sweeping of the UE. Then, the gNB informs the UE of in which slot the RACH signal should be transmitted. The gNB may inform the UE of a slot in which the RACH signal is to be transmitted through a bitmap having a specific system frame number (SFN) as a starting point, or inform the UE of the number of transmissions of the RACH signal that starts at a specific SFN under the assumption that the UE transmits the RACH signal in consecutive slots.

The methods mentioned in FIG. 8 may be equally applied even to the case in which a plurality of RACH resources is configured/allocated according to the present disclosure to be described later.

A mobile communication system performs handover of changing a serving cell of a UE that is moving so as to allow the UE to be served without discontinuity of communication. In a handover procedure, radio resource management (RRM) is used. To aid understanding of RRM measurement used for beam measurement/report of the present disclosure, RRM measurement in the LTE system will now be described first. The LTE system supports an RRM operation including power control, scheduling, cell search, cell re-selection, handover, radio link or connection monitoring, connection establishment/re-establishment, and the like. An eNB of a serving cell may request that the UE transmit RRM measurement information, which is a measurement value for the RRM operation. Typically, in the LTE system, the UE may measure, for each cell, cell search information, reference signal received power (RSRP), and reference signal received quality (RSRQ), and report the same. Specifically, in the LTE system, the UE receives measConfig (see 3GPP TS 36.331) as a higher-layer (e.g., a radio resource control (RRC)) signal for RRM measurement from a gNB of the serving cell. The UE measures RSRP or RSRQ according to information of measConfig. RSRP and RSRQ according to the document of 3GPP TS 36.214 of the LTE system, are defined as follows.

RSRP

Reference signal received power (RSRP), is defined as the linear average over the power contributions (in [W]) of the resource elements that carry cell-specific reference signals within the considered measurement frequency bandwidth. For RSRP determination the cell-specific reference signals R0 according 3GPP TS 36.211 shall be used. If the UE can reliably detect that R1 is available it may use R1 in addition to R0 to determine RSRP.

RSRQ

Reference Signal Received Quality (RSRQ) is defined as the ratio N*RSRP/(E-UTRA carrier RSSI), where N is the number of RBs of the E-UTRA carrier RSSI measurement bandwidth. The measurements in the numerator and denominator shall be made over the same set of resource blocks. E-UTRA carrier RSSI comprises the linear average of the total received power (in [W]) observed only in OFDM symbols containing reference symbols for antenna port 0, in the measurement bandwidth, over N number of resource blocks by the UE from all sources, including co-channel serving and non-serving cells, adjacent channel interference, thermal noise etc. If higher-layer signalling indicates certain subframes for performing RSRQ measurements, then RSSI is measured over all OFDM symbols in the indicated subframes. The reference point for the RSRQ shall be the antenna connector of the UE. If receiver diversity is in use by the UE, the reported value shall not be lower than the corresponding RSRQ of any of the individual diversity branches

RSSI

The received wide band power, including thermal noise and noise generated in the receiver, within the bandwidth defined by the receiver pulse shaping filter. The reference point for the measurement shall be the antenna connector of the UE. If receiver diversity is in use by the UE, the reported value shall not be lower than the corresponding UTRA carrier RSSI of any of the individual receive antenna branches.

According to the above definition, the UE operating in the LTE/LTE-A system may be allowed to measure RSRP in a bandwidth corresponding to one of 6, 15, 25, 50, 75, and 100 RBs, based on an allowed measurement bandwidth related information element (IE) transmitted in system information block type 3 (SIB3) in the case of intra-frequency measurement and based on an allowed measurement bandwidth related IE transmitted in system information block type 5 (SIB5) in the case of inter-frequency measurement. Alternatively, in the absence of the IE, the UE may measure RSRP in all frequency bands of a DL system by default. Upon receiving information about an allowed measurement bandwidth, the UE may regard a corresponding value as a maximum measurement bandwidth and freely measure the value of RSRP within the corresponding value. However, if a serving cell transmits an IE defined as a wide band RSRQ (WB-RSRQ) and sets the allowed measurement bandwidth to 50 RBs or more, the UE needs to calculate the value of RSRP for a total allowed measurement bandwidth. Meanwhile, RSSI is measured in a frequency bandwidth of a receiver of the UE according to definition of an RSSI bandwidth.

Figure 9:
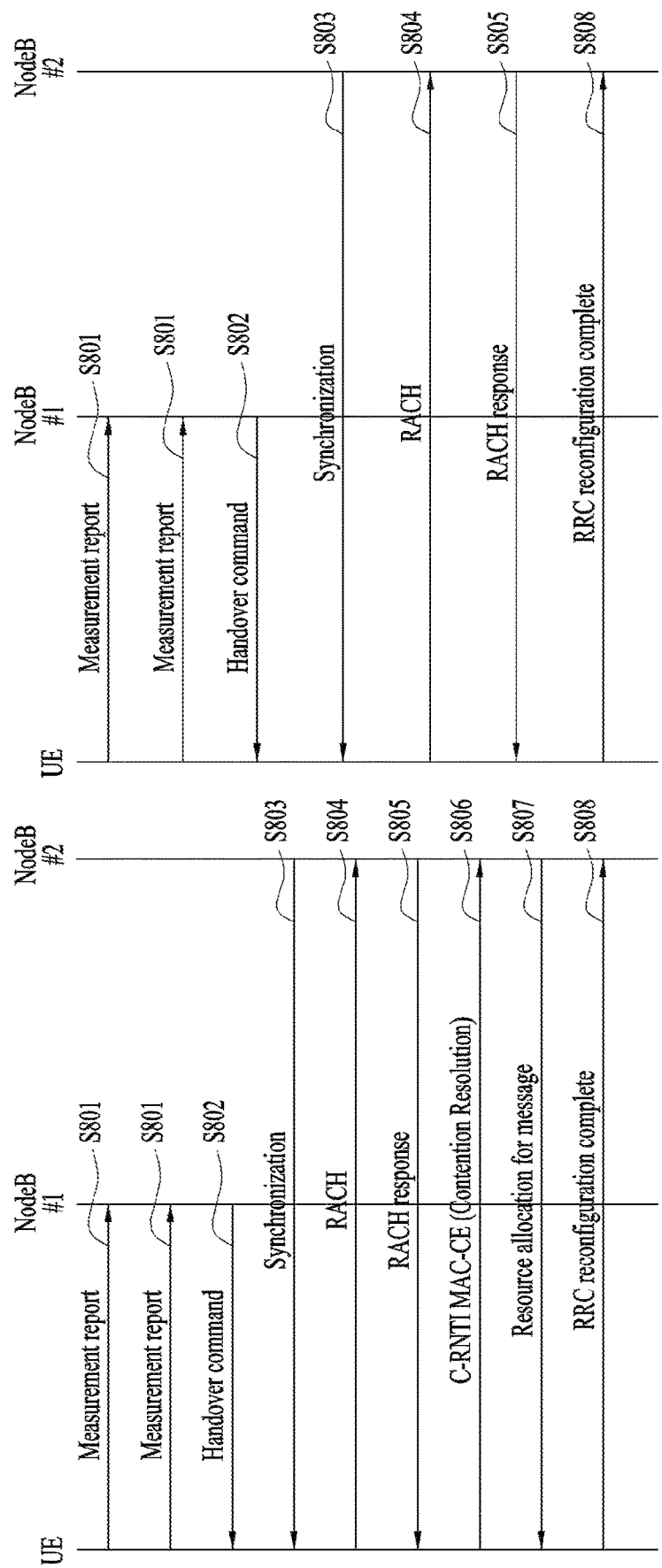
FIG. 9 illustrates a handover procedure.

FIG. 9 illustrates a handover procedure. Particularly, FIG. 9(a) illustrates a handover (HO) procedure using a contention-based RACH and FIG. 9(b) illustrates an HO procedure using a contention-free RACH.

Generally, the HO procedure is as illustrated in FIG. 9(a) and a brief description thereof is as follows.

Measurement report (S801): A UE reports RSRP/RSRQ per cell.

Handover command (S802): A base station informs the UE of a target cell to which the UE is to be handed over and information about the target cell.

Synchronization (S803) and RACH procedure (S804 to S807): The UE acquires (DL time and frequency) synchronization with the target cell and performs the RACH procedure with the target cell.

Handover complete (S808): The UE informs the base station of the target cell that HO has been completed.

FIG. 9(a) illustrates the HO procedure through the contention-based RACH. The base station may perform the contention-free RACH in order to reduce processing latency occurring in the HO procedure. The contention-free RACH does not require a retransmission procedure caused by resource collision with another UE because the UE uses a dedicated resource instead of a common resource in an RACH transmission procedure and has an advantage of reducing time to complete the HO procedure because the contention-free RACH does not require a contention resolution procedure.

The UE acquires a timing advance (TA) value for UL transmission through an RACH in the HO procedure and transmits an HO complete message for an HO command received from a source cell to the target cell, thereby completing the HO procedure.

In a multi-beam environment, the UE performs a beam acquisition procedure for the target cell as well as the aforementioned operation. The present disclosure describes a method of performing beam acquisition in the HO procedure through the contention-free RACH. An SS block or a CSI-RS may be used as a DL beam of the contention-free RACH procedure by network configuration. In the multi-beam environment, a plurality of SS blocks or a plurality of CSI-RSs may be configured.

b-1. Beam acquisition through measurement report: Beam acquisition according to measurement report may be considered to prevent waste of resources caused by allocation of a plurality of RACH resources. In order for a gNB not to allocate a plurality of UE-dedicated RACH resources, information about a beam having the best quality between the UE and the gNB in a procedure of determining HO should be valid. The UE continues to measure channel quality for a neighbor cell. In the multi-beam environment, the gNB transmits a signal for channel quality measurement through a plurality of beams per cell and the UE measures channel quality for each beam. In an NR system, a synchronization signal (SS) or a PBCH is used to perform channel quality measurement. In the present disclosure, the SS and/or the PBCH used for channel quality measurement is collectively referred to as an SS block. Generally, RSRP or RSRQ is used as measurement information for mobility. For convenience of description, all information used for mobility measurement is collectively referred to as RSRP. The UE transmits information about channel quality per cell and per beam, as well as information about channel quality per cell based on channel quality measurement per beam, to the gNB. The gNB may inform the UE of HO to a specific beam of a target cell using beam information of the target cell in a procedure of determining HO. In this case, one RACH resource (or RACH resources of a smaller number than a maximum number of beams of the target cell), rather than a plurality of RACH resources, may be allocated for HO. In order for the gNB to allocate RACH resource(s) using channel measurement per beam, the following considerations should be taken into account.

Measurement report (MR) information: MR may include the following information.

RSRP per cell: In the multi-beam environment, channel quality measurement is basically performed per beam. RSRP per cell may be defined in various types using RSRP per beam. For example, RSRP of the best beam, RSRP of N best beams which is an average of RSRP of N beams having the best channel quality, or RSRP of an average of all beams exceeding a threshold may be defined as RSRP per cell.

RSRP per beam: A beam index included in a reported cell and RSRP per beam may be included in MR together with RSRP per cell. Herein, RSRP per beam may be defined as RSRP of all beams detected in a cell or RSRP of N best beams among the beams detected in the cell.

Beam index: Since RSRP information per beam may cause large signaling overhead, MR may include a beam index rather than RSRP per beam. Herein, the beam index may be an index of the best beam, a beam index used to calculate RSRP per cell, or sorted index(es) of N best beam(s).

MR event: A communication system defines an event for transmitting MR. The gNB transmits a threshold for triggering the defined event to the UE and the UE transmits MR when the defined event occurs. In the present disclosure, an event using RSRP per beam may be additionally defined. For example, the following event(s) and parameters may be used.

Event: Case in which RSRP of a serving beam of a service cell is less than a specific threshold.

Event: Case in which RSRP of the best beam of the serving cell is less than the specific threshold.

Event: Case in which RSRP of the best beam of a neighbor cell is greater than the specific threshold.

Event: Case in which RSRP of the best beam of the neighbor cell is greater than RSRP of the serving beam of the serving cell by the specific threshold or more.

Event: Case in which RSRP of the best beam of the neighbor cell is greater than RSRP of the best beam of the serving cell by the specific threshold or more.

Note 1. RSRP per beam may be a result to which L3 filtering, L1/L2 filtering, or filtering is not applied. Filtering for RSRP per beam may be configured by the gNB in a manner similar to that mentioned in "filtering coefficient" described later.

Note 2. An event may be defined as a combination of the above events and the threshold may be separately defined case by case.

Note 3. The threshold used in definition of the events may be configured separately from the threshold used in RSRP per cell and an additional threshold per event may be configured.

Note 4. RSRP mentioned above is a representative index indicating channel quality. However, other quality indexes (e.g., RSRQ, signal-to-noise ratio (SNR), etc.) may also be used.

Note 5. While conditions for event trigger are compared, if channels for channel quality measurement between a serving cell and a neighbor cell are different (e.g., SS block RSRP for the neighbor cell and CSI-RS RSRP for the serving cell), a power cell for compensating for this case should be indicated by the gNB to the UE or should be predefined.

Filtering coefficient: The UE measures RSRP per cell and confirms whether a condition for event trigger is satisfied. If a variation in an RSRP value per cell is large, there is a problem that an event is too frequently triggered or HO is too frequently generated. To solve such a problem, the UE generally performs filtering for RSRP and the gNB informs the UE of a coefficient for filtering for RSRP, for stable operation of a system. However, if the UE performs too long filtering, an HO failure rate caused by filtering latency increases and, if the UE performs too short filtering, an HO ping-pong phenomenon appears. In the present disclosure, RSRP per cell may use long filtering to prevent frequent HO and RSRP per beam may use short filtering for stable beam acquisition. That is, for stable operation of the system, independent filtering coefficients may be desirably used for RSRP per cell and RSRP per beam. To cause the UE to use independent filtering coefficients for RSRP per cell and RSRP per beam, the gNB may transmit a plurality of filtering coefficients to the UE, or the gNB may transmit a filtering coefficient for RSRP per cell and, for RSRP per beam, make the UE use the latest value without performing filtering.

Power control: Since the gNB informs the UE of a beam index for DL beam acquisition, the gNB should inform the UE of reference channel information of power control which should be used during RACH transmission. The UE may use, as a reference channel, a channel (e.g., an SS block or a CSI-RS) linked to a beam index of a target cell to which the UE should perform access during HO. Alternatively, the gNB may directly indicate resource information of a specific reference channel (e.g., an SS block or a CSI-RS) to the UE. If a beam is configured by a hierarchical structure, the gNB informs the UE of link information between a higher beam and a lower beam and the UE may use, as the reference channel for power control, a channel linked to a higher part or a lower part of a beam linked to a beam index directly indicated by the gNB, using the link information. In this case, the UE may require an additional measurement procedure for a higher or lower beam or determine the reference channel for power control using already measured information.

b-2. Beam acquisition through allocation of multiple RACH resources: In the multi-beam environment, a beam acquisition operation in the HO procedure will now be described in brief. First, the HO procedure through a contention-based RACH procedure is equal to initial beam acquisition through RACH transmission in an initial acquisition procedure. That is, upon receiving an HO command in the HO procedure, the UE performs RACH transmission to the target cell. Prior to performing RACH transmission, the UE determines an SS block, i.e., a DL beam, having the best channel quality through channel quality measurement per beam. If the SS block having the best quality is determined, the gNB configures an RACH resource per SS block and may be aware of a DL beam index determined by the UE by identifying an RACH resource on which an RACH preamble is received. Similarly, the gNB may perform beam acquisition by configuring a plurality of UE-dedicated RACH resources even for the HO procedure through the contention-free RACH procedure. In this case, UE-dedicated RACH resources have an association with the respective best beams (or SS blocks) and the gNB informs the UE of information about the association. In the present disclosure, channel quality measurement per beam is used interchangeably with channel quality measurement for the SS block. That is, the SS block may be used as a channel which is representative of a beam. However, in addition to the SS block, an RS, such as a CSI-RS, that the gNB transmits through a beam may also be used for channel quality measurement per beam. Upon performing HO using channel quality information of an RS, such as the CSI-RS, which is representative of a beam corresponding to a beam located in a lower part in a hierarchical structure, as channel quality information per beam, the gNB may additionally inform the UE of information about association between the CSI-RS, which is representative of a lower beam in the hierarchical structure, and the SS block, which is representative of a higher beam and has an association with an RACH resource, so that the UE may select the RACH resource. This information may be used later in a procedure in which the UE selects the RACH resource.

In this case, the UE transmits an RACH preamble only using an RACH resource associated with the best beam (i.e., an SS block of the best quality or an SS block connected to a CSI-RS of the best quality) so as to connect the RACH preamble to a beam selected by the UE. However, the UE may transmit an RACH in a plurality of beam directions and the gNB may perform beam acquisition in a proper beam direction by reflecting information such as UE load per beam. If the UE performs RACH transmission by selecting beam(s) through which the UE is incapable of communicating with the gNB, since communication between the UE and the gNB may be disconnected, the gNB informs the UE of a condition under which the UE may select a beam. For example, the gNB may inform the UE of a threshold so that the UE may select only beams in which a difference between RSRP of the beams and RSRP of the best beam is less than the threshold.

When the gNB of a serving cell allocates, to the UE, an RACH resource for RACH transmission to the target cell through an HO command, the gNB may allocate a plurality of RACH resources and transmit information about association of the respective RACH resources with SS blocks to the UE. The UE may measure channel quality per SS block for the target cell or perform DL beam acquisition and delivery of information about the best DL beam (to the gNB of the target cell) through a proper RACH resource based on a result of channel quality measurement of a previously measured SS block.

In the above procedure, channel quality information through MR only needs to include channel quality information per cell or per unit of an MR for HO (e.g., per SS block or CSI-RS).

If a plurality of RACH resources is allocated for the HO procedure, since the UE only needs to transmit channel quality information per cell, signaling overhead is small. Since the UE performs a procedure of selecting a beam of the best equality after receiving an HO command, stability of beam acquisition and beam tracking may be raised.

Hereinafter, an RACH scheme of the present disclosure through allocation of a plurality of RACH resources will be described.

Figure 10:
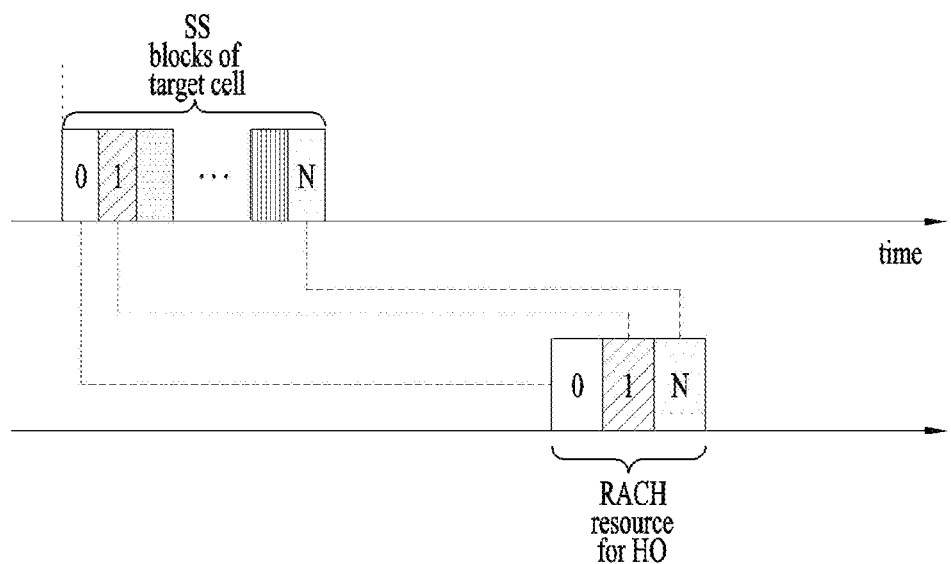
FIG. 10 illustrates a method of configuring RACH resources for handover.

FIG. 10 illustrates a method of configuring RACH resources for HO. Particularly, FIG. 10 exemplarily illustrates a method of using an SS block as a representative example of a DL beam and configuring RACH resources for multiple SS blocks for HO. Although the present disclosure will describe HO as a representative example of using a contention-free RACH, the present disclosure may also be applied to other cases in which the contention-free RACH is used (e.g., an RACH for UL synchronization acquisition (i.e., an RACH caused by a PDCCH order) or an RACH for a beam recovery procedure). In addition to the SS block, a CSI-RS may be used as a signal indicating DL.

In the present disclosure, if plural RACH resources are dedicatedly configured, this implies that an RACH preamble (e.g., a preamble sequence) and a time/frequency resource for transmitting the RACH preamble are dedicatedly configured for a specific purpose (e.g., HO or contention-free RACH). If a target cell dedicatedly configures plural RACH resources for HO, this means that corresponding RACH time/frequency resources are dedicated to HO or to a contention-free RACH and does not always mean that only one UE should use the corresponding RACH resources. That is, the contention-based RACH for normal initial access is not performed on the corresponding RACH resources (herein, dedicated RACH resources) and the corresponding RACH resources are distinguished from contention-based common RACH resources. One UE may occupy all the dedicated RACH resources, or plural UEs that attempt to perform HO may attempt to perform RACH using a dedicated preamble sequence on the corresponding time resources.

A plurality of UEs performing the contention-free based RACH may be present on an RACH resource configured on separate time/frequency for HO. In this case, a preamble sequence used on each RACH resource is a UE-dedicated sequence. That is, even if the UE changes a target SS block for an RACH procedure, the preamble sequence is equally maintained. This serves to cause the gNB to be aware of UE(s) that have transmitted preamble sequences received on plural RACH resources, respectively. This method may be applied when one SS block is associated with one RACH resource in one-to-one correspondence.

If a plurality of SS blocks (SSBs) is associated with one RACH resource, it may be difficult for one preamble sequence (hereinafter, a preamble) to be equally allocated to a plurality of RACH resources as a UE-dedicated sequence in the contention-free RACH procedure. If the number of preambles available on one RACH resource is fixed and a plurality of SSBs shares preambles available on one RACH resource, a plurality of SSBs associated with a specific RACH resource may be distinguished by preambles. For example, if the number of preambles available on an RACH resource is 64, two SSBs are associated with the RACH resource, and the number of preambles available for a contention-based RACH procedure is 48, then the number of preambles available for the contention-based RACH procedure per SSB is 24 and the remaining 16 preambles may be used for the contention-free RACH procedure. The preambles are sequentially allocated to SSBs consecutively for the contention-based RACH according to a preamble index and the remaining preamble indexes are used for the contention-free RACH procedure. That is, preambles are sequentially allocated to respective SSBs for the contention-based RACH according to a preamble index and preambles other than the preambles for the contention-based RACH are used for the contention-free RACH. For example, preambles of preamble indexes 0 to 23 are allocated to SSB index n and preambles of preamble indexes 24 to 47 are allocated to SSB index n+1. Although the remaining preambles of preamble indexes 48 to 63 are used for the contention-free RACH, explicitly associated SSB information may not be given for the remaining preambles. However, if a network allocates a plurality of RACH resources to one UE for the contention-free RACH and if a plurality of SSBs is associated with one RACH resource, the network may inform the UE of a starting preamble index of preamble(s) available to the UE as preamble information configured for/allocated to the UE. If the UE receives contention-based/contention-free RACH information, the network transmits information about mapping between the SSB and the RACH resource. Therefore, for example, if each RACH resource is associated with two SSBs, the UE may use two preambles including the starting preamble index for the contention-free RACH. The UE may select one of the two preambles to transmit a PRACH and then inform the network of a preferred DL beam.

The contention-free RACH procedure may be initiated by a PDCCH order or for the purpose of beam management between the gNB and the UE. This contention-free RACH procedure may be initiated when it is desired to adjust a UL timing in the case in which the UL timing of the UE deviates by a predetermined time or more or when it is desired for the network to determine a UL beam of the UE to be a beam of better quality. Even in this case, the network may configure a plurality of RACH resources for the UE for the contention-free RACH. If the SSB and the RACH resource are mapped in one-to-one correspondence, i.e., if the SSB and the RACH resource are associated in one-to-one correspondence, a single-dedicated preamble index may be allocated for the contention-free RACH procedure. The single dedicated preamble index may be used on any RACH resource and the UE may select a certain RACH resource on which the RACH preamble is to be transmitted based on DL signal (e.g., SSB) measurement. If the SSB and the RACH resource are mapped in M-to-one (i.e., M:1) correspondence, i.e., if a plurality of SSBs is associated with one RACH resource, at least M consecutive preambles may be dedicated to the contention-free RACH procedure and the number of preambles dedicated to the UE and a starting preamble index may be included in DL control information for triggering the RACH procedure. If the UE may be aware of a mapping rule between SSBs and RACH resources by previous allocation through system information, i.e., if the mapping rule between the SSBs and the RACH resources are signaled through the system information, the network only needs to indicate the starting preamble index to the UE. If the SSB and the RACH resource are associated in one-to-one correspondence, the UE fixedly uses a corresponding preamble based on the indicated preamble index on a plurality of RACH resources allocated to the UE. If the SSB and the RACH resource are mapped in M-to-one correspondence, the UE may use M consecutive preambles including the indicated preamble index for the contention-free RACH. For an RACH by a PDCCH order, a corresponding starting preamble index is included in DCI for triggering the RACH and, for an RACH by an HO command, the starting preamble index is indicated in corresponding HO command information. However, in the RACH procedure for HO, if the UE is not perfectly aware of RACH configuration information of the target cell, the network may inform the UE of the starting preamble index and mapping information between the SSB and the RACH resource to surely indicate preamble information to be used by the UE for the contention-free RACH.

Generally, if a plurality of RACH resources for HO is configured for a target cell (i.e., the gNB of the target cell), the UE may inform the target cell (i.e., the gNB of the target cell) of a DL beam direction preferred thereby by transmitting an RACH preamble (i.e., a PRACH) using an RACH resource connected to a DL beam preferred thereby among the plural RACH resources. However, if the plural RACH resources are dedicatedly configured, there is no reason for the UE, that desires to perform HO, not to use the RACH resources. Accordingly, if the network configures the plural RACH resources for HO, the network may cause the UE to transmit the RACH preamble on every RACH resource. This is different from retransmitting the RACH preamble (because the UE fails to receive a random access response (RAR) in an RAR window) after the UE attempts to receive the RAR for the RACH preamble in the RAR window in which the RAR is monitored after the UE transmits the RACH preamble. If the RACH resources are consecutive on the time axis or plural configured RACH resources are present before the RAR window, this implies that the UE may attempt to perform RACH preamble transmission on each of the RACH resources. Particularly, for a contention-free RACH for HO, this means that the UE may transmit the RACH preamble several times before the RAR window.

Referring to FIG. 10, if three RACH resources are configured for HO, the UE may transmit the RACH on each of the three RACH resources. Even if the UE transmits a plurality of RACH preambles, it is better for the gNB to transmit only one RAR for the plural RACH preambles rather than transmitting the RAR per RACH preamble transmission. For a contention-free RACH operation, since the network has already UE-dedicatedly allocated a sequence resource to be used by each UE, the network is already aware of which UE attempts to perform random access using which preamble sequence. If the UE transmits the RACH preamble on plural RACH time/frequency resources, one preamble available to a specific UE on the plural RACH time/frequency resources is designated/allocated and the same preamble is designated/allocated on every RACH resource for the specific UE. Then, even if the gNB transmits a single RAR, there is no ambiguity in communication between the UE and the gNB.

1) Power Setting

When the UE transmits an RACH preamble, RACH preamble (i.e., PRACH) transmission power is determined based on received signal power (RSRP) of a target SS block (or a target CSI-RS). As illustrated in FIG. 10, the network configures a plurality of RACH resources for the contention-free RACH for the UE and each RACH resource is configured to be connected to a DL beam (e.g., a specific SS block or a specific CSI-RS). The present disclosure proposes a method of determining transmission power of an RACH preamble by the UE when the UE desires to transmit the RACH preamble on the plural RACH resources. Most simply, transmission power of the RACH preamble transmitted on each RACH resource may be configured/determined based on reception power of an SS block to which a corresponding RACH resource is linked. However, since the target cell is completely unaware of respective transmission power values of plural RACH preambles, if the UE determines transmission power of the RACH preamble based on RSRP of an SS block and transmits the RACH preamble, there is a danger that the transmission power value of the RACH preamble provides incorrect information to the network. This is because the UE transmits the RACH preamble with high transmission power as the quality of a received signal of an SS block becomes worse and the UE transmits the RACH preamble with relatively low transmission power as the quality of the received signal of the SS block becomes better. As the quality of a received DL signal becomes better, the UE regards a received DL channel state as good and also regards a transmitted UL channel state of a beam direction having a good received DL channel state as good. Then, the UE transmits the RACH preamble with a relatively low transmission power so as not to generate an unnecessary amount of interference. As a result, if the UE transmits the RACH preamble on RACH resources for a plurality of SS blocks, the UE estimates pathloss (PL) based on the RSRP of the SS block. If the UE determines the transmission power of the RACH preamble according to the PL value, PL differs according to SS blocks (i.e., beams) and thus UL transmission power differs. Then, the gNB receive preambles of different power values from the UE and it may be difficult for the gNB to determine a proper Tx beam (i.e., DL beam). Therefore, it is undesirable that one UE differently determines RACH preamble transmission power per RACH resource on a plurality of RACH resources. If one UE transmits the RACH preamble on a plurality of RACH resources dedicated to the contention-free RACH, it is better to equally configure the transmission power of the RACH preamble transmitted by the UE across the RACH resources. For example, the UE determines the transmission power of the RACH preamble based on a DL beam received with the best RSRP among DL beams linked to the configured plural RACH resources and uses this value even during RACH preamble transmission on an RACH resource connected to another DL beam rather than the corresponding DL beam. If the UE transmits the RACH preamble on the plural RACH resources, the network may preconfigure a DL beam, i.e., an SS block index or a CSI-RS index, which is a basis to determine the transmission power of the RACH preamble, and inform the UE of the preconfigured DL beam.

2) DL Beam Acquisition

In the contention-free RACH procedure according to the present disclosure, a plurality of RACH resources linked to a plurality of DL beams is configured for the UE. If the UE transmits an RACH preamble on each of the configured plural RACH resources, a DL beam acquisition procedure may be performed as follows. If the UE receives information about RACH resource(s) linked to each SS block in the contention-based RACH procedure and selects a specific RACH resource to transmit the RACH preamble on the corresponding RACH resource, this means that the UE indicates a specific DL beam preferred thereby the UE to the network. That is, the gNB transmits a subsequent DL signal (e.g., an RAR and Msg4, and DL signal after the RAR and Msg4) in a DL beam direction linked to an RACH resource on which the RACH preamble is received. However, when an RACH resource linked to each DL beam (i.e., a gNB Tx beam) is present, if the UE transmits RACH preambles on a plurality of RACH resources and the gNB successfully receives the plural RACH preambles, a direction in which the gNB should transmit a DL signal, particularly, an RAR, to the UE is problematic. The present disclosure proposes that the gNB specify a DL beam direction based on whether a UL preamble is successfully received from the UE or on received signal quality. That is, the gNB determines which DL beam is optimal based on received performance of the UL beam for the UE. If the gNB receives preambles from the UE on a plurality of RACH resources (in a predetermined time), the gNB transmits an RAR for the preambles in a DL beam direction linked to an RACH resource on which an RACH preamble is received with the best received signal quality. The gNB may transmit DL beam direction information (e.g., SS block index or CSI-RS index) in an RAR message in order to certainly specify the DL beam direction for the UE.

However, since the UE is unaware of in which direction the gNB will transmit the RAR, the UE attempts to receive the RAR in a relatively wide beam direction so that the UE may simultaneously receive a plurality of DL beams linked to RACH resources which are selected and transmitted by the UE. After the UE receives the RAR and confirms a DL beam index in a message of the RAR, the UE forms a reception beam for receiving Msg4 in a DL beam direction of the DL beam index.

In determination of a DL beam based on UL beam received performance by the gNB according to the present disclosure, a DL beam direction and a UL beam direction cannot be different in fact. In this case, even when DL beam index information is not included in the RAR, the UE may determine a DL beam direction for receiving Msg4 using UL beam information for Msg3 transmission. Alternatively, a UL beam direction for Msg3 transmission may be specified using the DL beam index information in the RAR.

3) RACH Resource Selection

When the network configures an RACH resource in each DL beam direction for a contention-free RACH, the UE that has received a command for contention-free RACH transmission may transmit PRACH Msg1 (i.e., RACH preamble) using a configured specific preamble sequence on all configured RACH resources. The network may cause the UE to transmit PRACH Msg1 on all RACH time/frequency resources configured for the contention-free RACH or transmit PRACH Msg1 only for a DL beam satisfying a specific condition. The gNB may cause the UE to determine RACH time/frequency resource(s) on which PRACH Msg1 is to be transmitted according to a measurement result of the UE for a DL beam. For example, the gNB may configure a threshold of received RSRP of a DL beam for PRACH Msg1 transmission for the UE or cause the UE to transmit PRACH Msg1 only for DL beams received with RSRP in a predetermined range compared with a DL beam received with the best signal quality.

Figure 11:
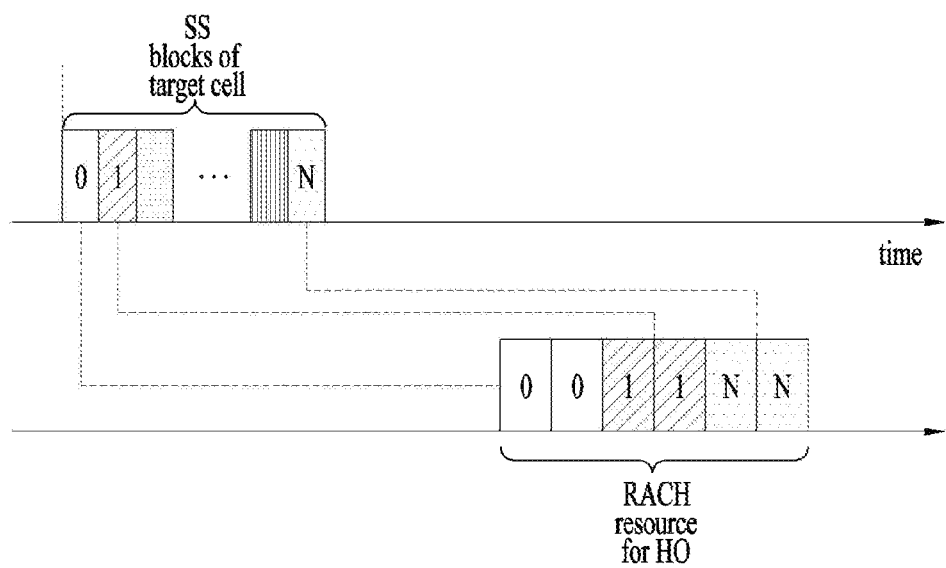
FIG. 11 illustrates another method of configuring an RACH resource for HO.

FIG. 11 illustrates another method of configuring an RACH resource for HO.

Upon configuring a plurality of RACH time/frequency resources for a contention-free RACH, the gNB may configure a plurality of RACH resources per SS block as illustrated in FIG. 11. Particularly, the BS may configure a plurality of RACH resources per SS block for the case in which Tx/Rx beam correspondence (BC) of the UE or the gNB is not perfect. Operations for the case in which Tx/Rx BC of the UE is not perfect and the case in which Tx/Rx BC of the gNB is not perfect may be different.

1) Tx/Rx BC of the gNB does not Hold

The network/gNB determines a received beam direction of the gNB by configuring a plurality of RACH resources in the same DL beam direction and performing beam scanning for RACH preamble reception. The gNB may also determine the received beam direction through received beam scanning by the gNB by causing the UE to repeatedly transmit a preamble. In this case, the UE fixes a preamble transmission beam direction thereof while repeatedly transmitting the preamble. If the gNB should cause the UE to perform additional preamble repetition because the number of received beam directions of the gNB is larger than the number of preamble repetitions indicated by a preamble format, the network may cause the UE to sufficiently perform repeated transmission of the RACH preamble by configuring a plurality of RACH resources for the same DL beam direction and specify a received beam direction of the gNB.

2) Tx/Rx BC of UE does not Hold

The network/gNB may configure a plurality of RACH resources for the same DL beam direction and the UE may transmit an RACH preamble in different beam directions so that the network may specify a transmission beam direction of the UE. That is, the UE may transmit the preamble while sweeping a transmission beam and the network may determine the best UL beam direction based on UL preamble received signal quality for a specific DL beam direction and inform the UE of the determined beam direction through a DL signal such as an RAR.

As illustrated in FIG. 11, when the network/gNB configures a plurality of RACH resources for the same DL beam direction for the contention-free RACH, a DL/UL beam acquisition method should be clear. Primarily, DL beam acquisition by the gNB may specify a DL beam direction having a function of the best received signal quality (e.g., highest value, average value, or added value) of a plurality of RACH preambles received per DL beam direction as a DL beam of a corresponding UE. In addition, the gNB may determine a UL beam direction received with the best signal quality among RACH resources associated with a selected DL beam direction and signal information as to on which RACH resource the preamble is received with the best signal quality to the UE. In this case, a DL beam direction and a UL beam direction may not be equal. The gNB may signal information about the best DL beam index and the best UL beam index through the RAR and the UL beam index may be an order (number) of an RACH resource configured in association with the selected DL beam.

Even when the network specifies a DL beam direction, since the UE has no way to be aware of the DL beam direction until the UE receives the RAR, the UE may receive the RAR by forming a received beam so as to simultaneously receive all DL beam directions in which the UE has transmitted the RACH. If the UE acquires information about the DL beam direction by receiving the RAR, the UE may receive a DL signal by forming the received beam in a DL beam direction specified after the RAR, for example, from reception of Msg4.

Figure 12:
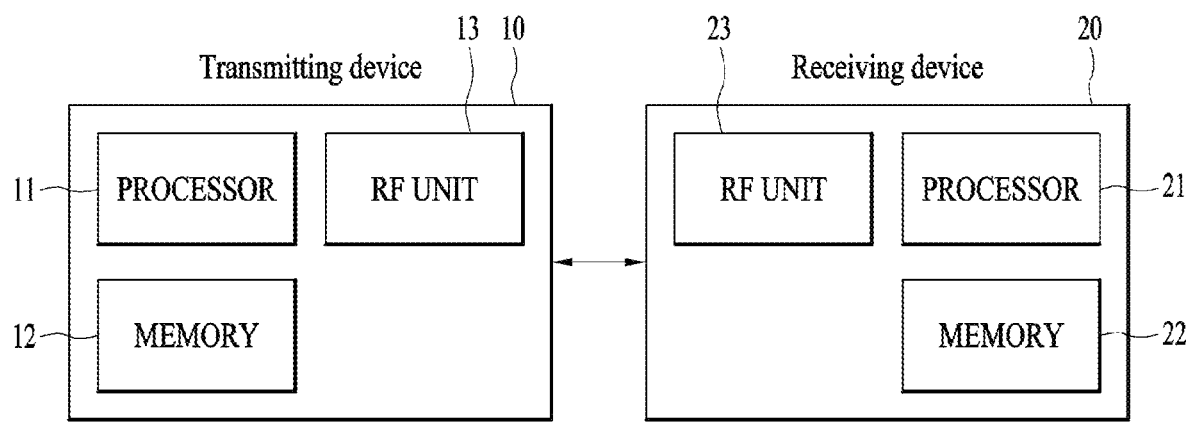
FIG. 12 is a block diagram illustrating elements of a transmitting device 10 and a receiving device 20 for implementing the present disclosure.

FIG. 12 is a block diagram illustrating elements of a transmitting device 10 and a receiving device 20 for implementing the present disclosure.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present disclosure.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present disclosure. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present disclosure is implemented using firmware or software, the firmware or software may be configured to include modules, procedures, functions, etc. performing the functions or operations of the present disclosure. Firmware or software configured to perform the present disclosure may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the present disclosure, the RF units 13 and 23 may support Rx BF and Tx BF. For example, in the present disclosure, the RF units 13 and 23 may be configured to perform the function illustrated in FIG. 3.

In the embodiments of the present disclosure, a UE operates as the transmitting device 10 in UL and as the receiving device 20 in DL. In the embodiments of the present disclosure, a gNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the gNB will be referred to as a gNB processor, a gNB RF unit, and a gNB memory, respectively.

The gNB processor of the present disclosure may configure/allocate one or plural RACH resources for a contention-free random access procedure for/to the UE according to one method of the present disclosure. The gNB processor may allocate a UE-dedicated preamble (sequence) to be used in the contention-free random access procedure to the UE. The gNB processor may control the gNB RF unit to transmit configuration information regarding the RACH resource(s) configured for/allocated to the UE and configuration information regarding the UE-dedicated preamble (sequence) to the UE. The UE RF unit may receive the configuration information regarding the RACH resource(s) and the configuration information regarding the UE-dedicated preamble (sequence), for the contention-free random access procedure. The UE processor may control the UE RF unit to perform the contention-free random access procedure based on the configuration information received by the UE RF unit. The UE processor for/to which the plural RACH resources are configured/allocated for contention-free random access may control the UE RF unit to transmit the same UE-dedicated preamble on each of the RACH resources. The UE processor may control the UE RF unit to transmit the UE-dedicated preamble with the same power on each of the RACH resources. The gNB processor may control the gNB RF unit to attempt to receive an RACH preamble on the RACH resource(s) configured/allocated for the contention-free random access procedure. If the RACH preamble is detected on the RACH resource(s) for the contention-free random access procedure, the gNB processor may be aware of which UE has transmitted the RACH preamble from a preamble sequence in a sequence part of the RACH preamble. This is because the preamble sequence is dedicatedly allocated to the UE. If a plurality of RACH resources is configured/allocated for contention-free random access, the gNB processor may determine the best DL beam detected from the UE that has transmitted the RACH preamble based on an RACH resource on which the RACH preamble is detected. The gNB processor may control the gNB RF unit to transmit an RAR for the RACH preamble through the best DL beam. The UE processor may control the UE RF unit to receive the RAR for the RACH preamble transmitted on each of the one or plural RACH resources. The RAR may include information according to the present disclosure.

The gNB processor or the UE processor of the present disclosure may be configured to apply the present disclosure on a cell operating in a high frequency band of 6 GHz or above in which analog or hybrid beamforming is used.

As described above, the detailed description of the preferred embodiments of the present disclosure has been given to enable those skilled in the art to implement and practice the disclosure. Although the disclosure has been described with reference to exemplary embodiments, those skilled in the art will appreciate that various modifications and variations can be made in the present disclosure without departing from the spirit or scope of the disclosure described in the appended claims. Accordingly, the disclosure should not be limited to the specific embodiments described herein, but should be accorded the broadest scope consistent with the principles and novel features disclosed herein.

INDUSTRIAL APPLICABILITY

The embodiments of the present disclosure are applicable to a BS, a UE, or other devices in a wireless communication system.

What is claimed is:

1. A method of transmitting a random access channel (RACH) by a user equipment (UE) in a wireless communication system, the method comprising:
receiving i) RACH resource information for contention free random access (CFRA), including information regarding an association relation between synchronization signal (SS) blocks of a cell and RACH resources associated with the SS blocks of the cell, and ii) RACH preamble information indicating a dedicated preamble sequence for the CFRA,
wherein the SS blocks of the cell includes at least a first SS block and a second SS block different from the first SS block, and
wherein the RACH resources associated with the SS blocks of the cell includes at least a first RACH resource and a second RACH resource different from the first RACH resource;
detecting the first SS block and the second SS block among the SS blocks of the cell;
transmitting i) the dedicated preamble sequence on the first RACH resource associated with the first SS block of the cell and ii) the dedicated preamble sequence on the second RACH resource associated with the second SS block of the cell, based on the RACH resource information and the RACH preamble information; and
monitoring a random access response (RAR) during a RAR time window, based on transmitting the dedicated preamble sequence on each of the first RACH resource and the second RACH resource.

2. The method of claim 1, wherein the dedicated preamble sequence is transmitted with a same transmission power on the first RACH resource and the second RACH resource.

3. The method of claim 1,
wherein the RAR includes beam direction information regarding a downlink beam direction for the UE, and
wherein the beam direction information includes an SS block index of the first or second SS block.

4. A method of receiving a random access channel (RACH) by a base station (BS) in a wireless communication system, the method comprising:
transmitting, to a user equipment (UE), i) RACH resource information for contention free random access (CFRA), including information regarding an association relation between synchronization signal (SS) blocks of a cell and RACH resources associated with the SS blocks of the cell, and ii) RACH preamble information indicating a dedicated preamble sequence for the CFRA,
wherein the SS blocks of the cell includes at least a first SS block and a second SS block different from the first SS block, and
wherein the RACH resources associated with the SS blocks of the cell includes at least a first RACH resource and a second RACH resource different from the first RACH resource;
transmitting the SS blocks of the cell;
attempting to receive, from the UE, i) the dedicated preamble sequence on the first RACH resource associated with the first SS block of the cell and ii) the dedicated preamble sequence on the second RACH resource associated with the second SS block of the cell, based on the RACH resource information and the RACH preamble information; and
transmitting a random access response (RAR) during a RAR time window, based on receiving the dedicated preamble sequence on at least the first RACH resource or the second RACH resource.

5. The method of claim 4, further comprising:
selecting a downlink beam direction for the UE based on receiving based on receiving the dedicated preamble sequence on at least the first RACH resource or the second RACH resource,
wherein the RAR includes beam direction information regarding the downlink beam direction for the UE, and
wherein the beam direction information includes an SS block index of the first or second SS block.

6. A user equipment (UE) for transmitting a random access channel (RACH) in a wireless communication system, the UE comprising,
a radio frequency (RF) transceiver;
a processor;
a memory storing at least one program that causes the processor to perform operations comprising:
receiving, via the RF transceiver, i) RACH resource information for contention free random access (CFRA), including information regarding an association relation between synchronization signal (SS) blocks of a cell and RACH resources associated with the SS blocks of the cell, and ii) RACH preamble information indicating a dedicated preamble sequence for the CFRA,
wherein the SS blocks of the cell includes at least a first SS block and a second SS block different from the first SS block, and
wherein the RACH resources associated with the SS blocks of the cell includes at least a first RACH resource and a second RACH resource different from the first RACH resource;
detecting the first SS block and the second SS block among the SS blocks of the cell;
transmitting, via the RF transceiver, i) the dedicated preamble sequence on the first RACH resource associated with the first SS block of the cell and ii) the dedicated preamble sequence on the second RACH resource associated with the second SS block of the cell, based on the RACH resource information and the RACH preamble information; and
monitoring a random access response (RAR) during a RAR time window, based on transmitting the dedicated preamble sequence on each of the first RACH resource and the second RACH resource.

7. The user equipment of claim 6, wherein the dedicated preamble sequence is transmitted with a same transmission power on the first RACH resource and the second RACH resource.

8. The user equipment of claim 6,
wherein the RAR includes beam direction information regarding a downlink beam direction for the UE, and
wherein the beam direction information includes an SS block index of the first or second SS block.

9. A base station (BS) for receiving a random access channel (RACH) in a wireless communication system, the BS comprising, a radio frequency (RF) transceiver;
a processor; and
a memory storing at least one program that causes the processor to perform operations comprising:
transmitting, to a user equipment (UE), i) RACH resource information for contention free random access (CFRA), including information regarding an association relation between synchronization signal (SS) blocks of a cell and RACH resources associated with the SS blocks of the cell, and ii) RACH preamble information indicating a dedicated preamble sequence dedicated for the CFRA,
wherein the SS blocks of the cell includes at least a first SS block and a second SS block different from the first SS block, and
wherein the RACH resources associated with the SS blocks of the cell includes at least a first RACH resource and a second RACH resource different from the first RACH resource;
transmitting the SS blocks of the cell;
attempting to receive, from the UE, i) the dedicated preamble sequence on the first RACH resource associated with the first SS block of the cell and ii) the dedicated preamble sequence on the second RACH resource associated with the second SS block of the cell, based on the RACH resource information and the RACH preamble information; and
transmitting a random access response (RAR) during a RAR time window, based on receiving the dedicated preamble sequence on at least the first RACH resource or the second RACH resource.

10. The base station of claim 9, wherein the operations further comprise:
selecting a downlink beam direction for the UE based on receiving based on receiving the dedicated preamble sequence on at least the first RACH resource or the second RACH resource,
wherein the RAR includes beam direction information regarding a downlink beam direction for the UE, and
wherein the beam direction information includes an SS block index of the first or second SS block.

* * * * *